(12) United States Patent
Li et al.

(10) Patent No.: US 12,113,458 B2
(45) Date of Patent: Oct. 8, 2024

(54) DRIVE SYSTEM WITH COMMON DC BUS

(71) Applicant: Eaton Intelligent Power Limited, Dublin (IE)

(72) Inventors: Huaqiang Li, Menomonee Falls, WI (US); Xiaoling Li, Guangdong (CN); Belly Lei, Guangdong (CN)

(73) Assignee: Eaton Intelligent Power Limited, Dublin (IE)

( * ) Notice: Subject to any disclaimer, the term of this patent is extended or adjusted under 35 U.S.C. 154(b) by 405 days.

(21) Appl. No.: 17/313,322

(22) Filed: May 6, 2021

(65) Prior Publication Data

US 2021/0359621 A1    Nov. 18, 2021

Related U.S. Application Data

(60) Provisional application No. 63/024,610, filed on May 14, 2020.

(51) Int. Cl.
| | |
|---|---|
| *H02M 7/537* | (2006.01) |
| *H02M 1/32* | (2007.01) |
| *H02P 6/20* | (2016.01) |
| *H02P 6/28* | (2016.01) |
| *H02P 27/08* | (2006.01) |

(52) U.S. Cl.
CPC ............ *H02M 7/537* (2013.01); *H02M 1/32* (2013.01); *H02P 6/20* (2013.01); *H02P 6/28* (2016.02); *H02P 27/08* (2013.01)

(58) Field of Classification Search
CPC ........ H02M 7/537; H02M 1/32; H02M 5/458; H02M 7/06; H02M 1/325; H02M 1/008; H02M 1/36; H02M 7/062; H02M 7/53871; H02P 6/20; H02P 6/28; H02P 27/08

See application file for complete search history.

(56) References Cited

U.S. PATENT DOCUMENTS

| | | | |
|---|---|---|---|
| 8,953,296 B2 * | 2/2015 | Weiss ..................... | H02H 7/125 361/114 |
| 9,042,146 B2 * | 5/2015 | Weiss ................... | H02M 7/537 363/131 |
| 9,143,029 B2 * | 9/2015 | Sihler ...................... | H02J 1/08 |
| 9,553,533 B2 * | 1/2017 | Weiss ....................... | H02P 6/28 |

(Continued)

OTHER PUBLICATIONS

LXM32 Common DC bus Application note, MNA01M001EN, V1.01, Schneider Electric, Aug. 2014.

(Continued)

*Primary Examiner* — Yusef A Ahmed
(74) *Attorney, Agent, or Firm* — DiBerardino McGovern IP Group LLC

(57) ABSTRACT

A system includes: a pre-charge circuit configured to produce direct current (DC) electrical power; a common DC bus; and a plurality of inverters, each inverter including: a local DC bus; a capacitor network connected to the local DC bus; an electrical network connected to the local DC bus, the electrical network configured to generate an alternating current (AC) drive signal; and a plurality of switching assemblies, each switching assembly being associated with one of the inverters, and each switching assembly configured to control whether the local DC bus and the capacitor network of the associated inverter are electrically connected to the common DC bus or to the pre-charge circuit.

21 Claims, 13 Drawing Sheets

(56) References Cited

U.S. PATENT DOCUMENTS

| | | | | |
|---|---|---|---|---|
| 9,876,438 B2* | 1/2018 | Kato | | H02M 7/06 |
| 10,516,365 B1* | 12/2019 | Serban | | H02M 7/487 |
| 11,177,648 B2* | 11/2021 | Li | | H02H 7/08 |
| 11,233,475 B2* | 1/2022 | Valasek | | H02P 27/04 |
| 11,349,386 B2* | 5/2022 | Yeo | | H02J 7/02 |
| 2010/0078998 A1* | 4/2010 | Wei | | H02M 5/458 |
| | | | | 307/31 |
| 2013/0119903 A1* | 5/2013 | Weiss | | H02H 7/125 |
| | | | | 318/400.3 |
| 2013/0121051 A1* | 5/2013 | Weiss | | H02P 6/28 |
| | | | | 363/131 |
| 2013/0241451 A1* | 9/2013 | Wei | | H02M 7/125 |
| | | | | 318/400.3 |
| 2014/0300298 A1* | 10/2014 | Liu | | H02P 27/14 |
| | | | | 318/380 |
| 2015/0098257 A1* | 4/2015 | Wei | | H05K 7/1432 |
| | | | | 363/37 |
| 2015/0124412 A1* | 5/2015 | Keegan | | H05K 13/00 |
| | | | | 361/728 |
| 2016/0172992 A1* | 6/2016 | Tallam | | H02M 1/36 |
| | | | | 363/37 |
| 2016/0352252 A1* | 12/2016 | Yu | | H02M 7/125 |
| 2017/0271998 A1* | 9/2017 | Ichihara | | H02M 1/32 |
| 2017/0373630 A1* | 12/2017 | Figie | | H02P 29/024 |
| 2019/0199086 A1* | 6/2019 | Li | | H02M 7/003 |
| 2021/0359632 A1* | 11/2021 | Valasek | | H02M 7/125 |
| 2022/0402390 A1* | 12/2022 | Smolenaers | | H02J 3/322 |

OTHER PUBLICATIONS

Nelson, "Common dc bus drive advantages," Control Engineering, available at www.controleng.com/articles/common-dc-bus-drive-advantages/, Nov. 2003.

Wijenayake et al., Modeling and Analysis of Shared/Common DC Bus Operation of AC Drives (Part I), IEEE Industry Application Society, Annual meeting, New Orleans, LA, Oct. 1997.

* cited by examiner

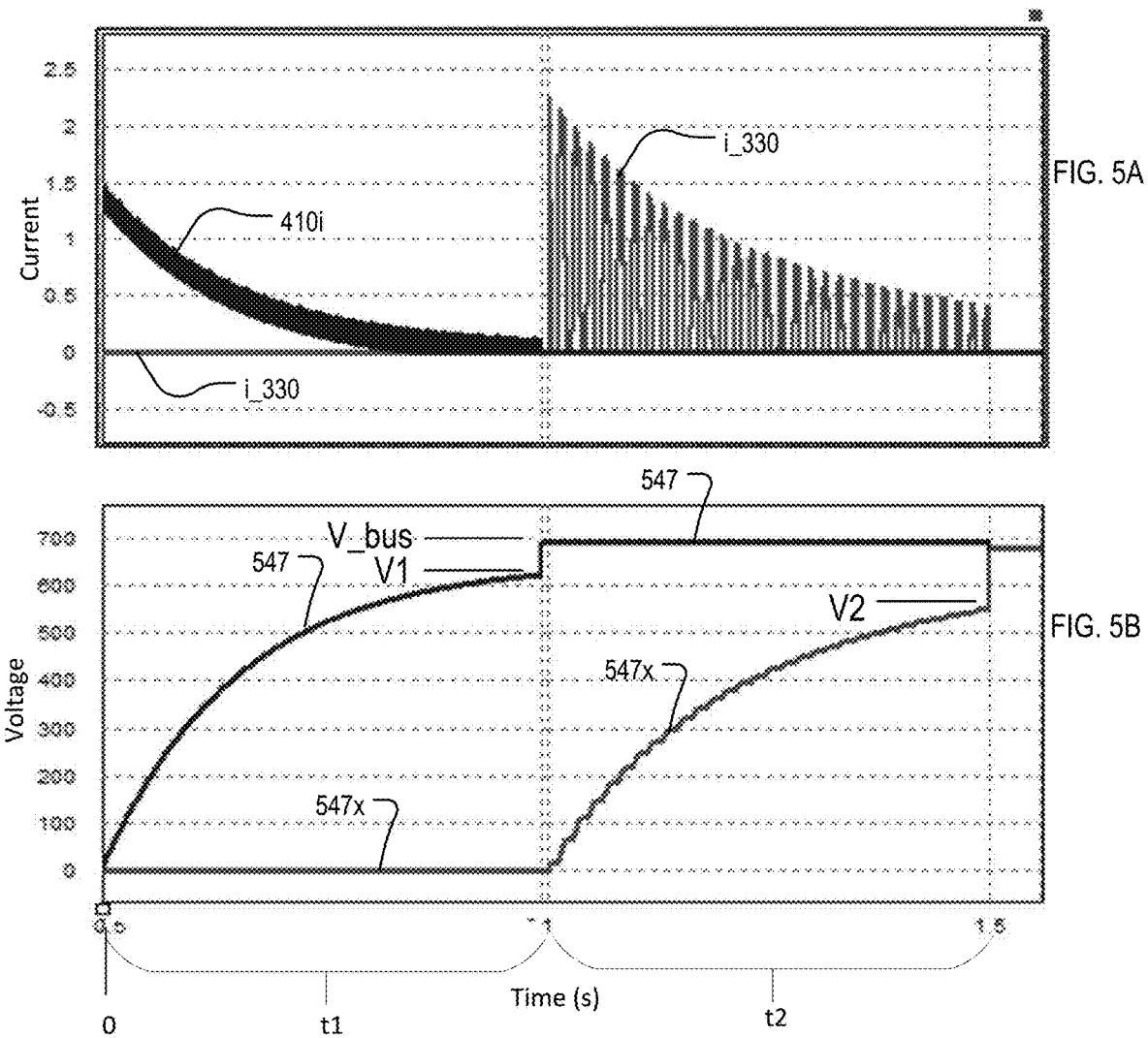

the pre-charge circuit is configured to provide a DC pre-charge current to all of the capacitor networks while the capacitor networks are electrically connected to the common DC bus, and the auxiliary pre-charge circuit is configured to pre-charge a capacitor network associated with another inverter while at least some of the other capacitor networks are electrically connected to the common DC bus.

DRIVE SYSTEM WITH COMMON DC BUS

CROSS-REFERENCE TO RELATED APPLICATION

This application claims the benefit of U.S. Provisional Application No. 63/024,610, filed on May 14, 2020 and titled DRIVE SYSTEM WITH COMMON DC BUS, which is incorporated herein by reference in its entirety.

TECHNICAL FIELD

This disclosure relates to a fault-tolerant drive system with a common direct current (DC) bus.

BACKGROUND

A drive system may be used to drive a load such as a motor. Some drive systems include a common DC bus that may supply DC power to more than one inverter.

SUMMARY

In one aspect, a system includes: a pre-charge circuit configured to produce direct current (DC) electrical power; a common DC bus; and a plurality of inverters, each inverter including: a local DC bus; a capacitor network connected to the local DC bus; an electrical network connected to the local DC bus, the electrical network configured to generate an alternating current (AC) drive signal; and a plurality of switching assemblies, each switching assembly being associated with one of the inverters, and each switching assembly configured to control whether the local DC bus and the capacitor network of the associated inverter are electrically connected to the common DC bus or to the pre-charge circuit.

Implementations may include one or more of the following features. The pre-charge circuit may be configured to provide DC electrical power to the capacitor network of the local DC bus of at least one of the plurality of inverters while the local DC bus of at least one other of the plurality of inverters is electrically connected to the common DC bus.

The pre-charge circuit may be electrically connected to an AC electrical power source and the pre-charge circuit also may include at least one electronic element configured to convert AC electrical power to DC electrical power. The at least one electronic element configured to convert AC electrical power to DC electrical power may be a diode.

In some implementations, the system also includes a converter electrically connected to the AC electrical power source and to the common DC bus, where the converter is configured to convert AC electrical power from the AC electrical source to DC electrical power and to provide the DC electrical power to the common DC bus. The converter may be a front-end rectifier and the AC electrical power source may be a multi-phase high-voltage electrical power distribution network.

In some implementations, the pre-charge circuit is electrically connected to the common DC bus, and the pre-charge circuit receives DC electrical power from the common DC bus.

The system also may include a control system configured to control the plurality of switching assemblies.

The pre-charge circuit may be an auxiliary pre-charge circuit, and, in these implementations, the system additionally may include a common pre-charge circuit electrically connected to the common DC bus, where the common pre-charge circuit is configured to provide a DC pre-charge current to all of the capacitor networks while the capacitor networks are electrically connected to the common DC bus, and the auxiliary pre-charge circuit is configured to pre-charge a capacitor network associated with another inverter while at least some of the other capacitor networks are electrically connected to the common DC bus.

In another aspect, a method includes: electrically connecting a local DC bus of a first inverter to a common DC bus, where the first inverter is associated with a first switching assembly; operating a second switching assembly associated with a second inverter to electrically connect a local DC bus of the second inverter to a pre-charge circuit while the local DC bus of the first inverter is electrically connected to the common DC bus and while the local DC bus of the first inverter receives DC electrical power from the common DC bus; comparing a voltage of a capacitor network electrically connected to the local DC bus of the second inverter to a threshold voltage while the local DC bus of the first inverter is electrically connected to the common DC bus and while the local DC bus of the first inverter receives DC electrical power from the common DC bus; and determining whether to disconnect the local DC bus of the second inverter from the pre-charge circuit and whether to connect the local DC bus of the second inverter to the common DC bus based on the comparison. The first switching assembly is configured to connect the local DC bus of the first inverter to the common DC bus or the pre-charge circuit, and the second switching assembly is configured to connect the local DC bus of the second inverter to the common DC bus or the pre-charge circuit.

Implementations may include one or more of the following features.

Determining whether to disconnect the local DC bus of the second inverter from the pre-charge circuit and to connect the local DC bus of the second inverter to the common DC bus based on the comparison may include disconnecting the first inverter from the pre-charge circuit if a measured voltage of the local DC bus of the second inverter is equal to or greater than the threshold voltage.

The method also may include pre-charging a capacitor network of the first inverter through a common pre-charge circuit electrically connected to the common DC bus prior to operating the second switching assembly.

In another aspect, a system includes a pre-charge circuit configured to produce direct current (DC) electrical power; a common DC bus; a plurality of inverters, each inverter including: a local DC bus, a capacitor network electrically connected to the local DC bus, and an electrical network electrically connected to the local DC bus, the electrical network configured to generate an alternating current (AC) drive signal. The capacitor network of each inverter is configured to be electrically connected to the common DC bus or the pre-charge circuit.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

FIGS. 5A and 5B show example data.

DETAILED DESCRIPTION

Figure 1A:
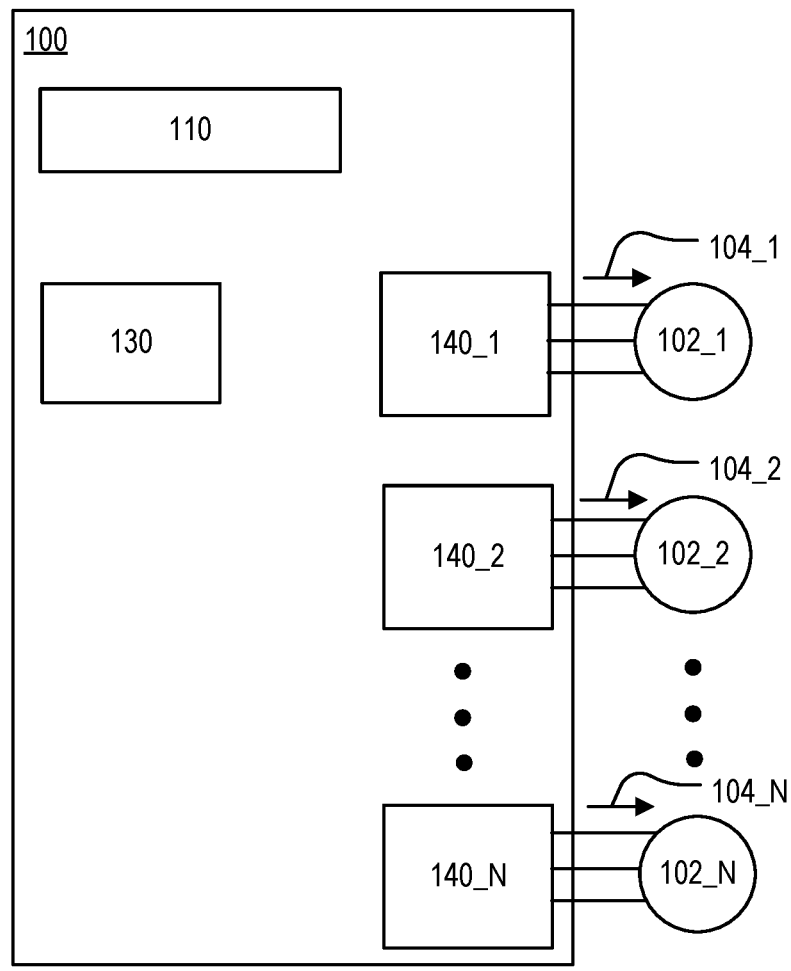
FIG. 1A shows an example of a drive system.

Referring to FIG. 1A, a block diagram of an example of a drive system 100 is shown. The drive system 100 includes inverters 140_1 to 140_N (collectively referred to as the N inverters 140), where N is an integer number greater than one. Each of the N inverters is connected to a respective load 102_1 to 102_N. The loads 102_1 to 102_N may be motors 102_1 to 102_N, which may be brushless DC motors, permanent magnet AC motors, or AC induction motors, just to name a few. The motors 102_1 to 102_N may be used in, for example, a warehouse, a distribution center, or a manufacturing facility and may be part of a heating, ventilation, and air conditioning (HVAC) system; a material handling system; or a pump system. When the N inverters 140 are operational, each of the inverters is able to produce a respective drive signal 104_1 to 104_N, which is provided to the respective load 102_1 to 102_N. The drive signals 104_1 to 104_N are three-phase AC electrical signals (for example, three-phase voltage and current signals).

Figure 1B:
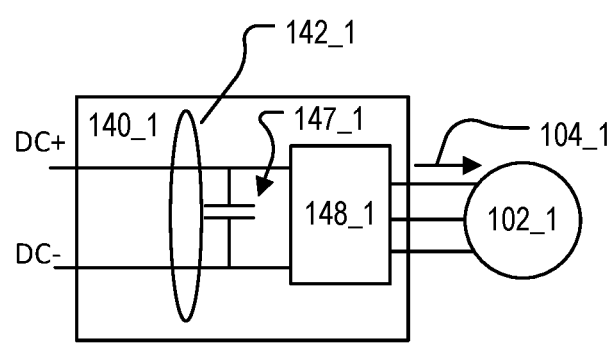
FIG. 1B shows an example of an inverter that may be used in the drive system of FIG. 1A.
Figure 1C:
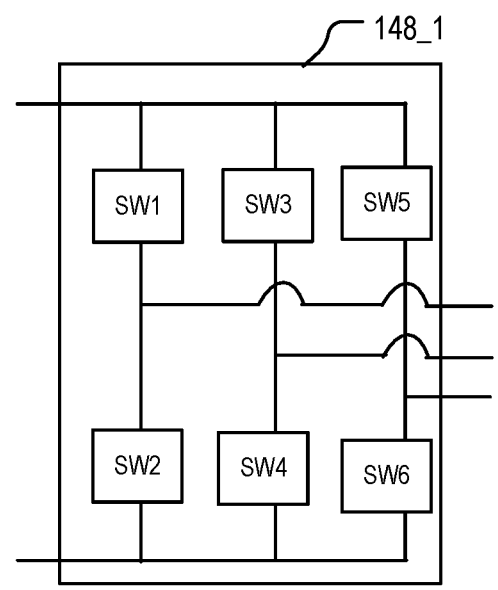
FIG. 1C shows an example of an electronic network that may be used in the inverter of FIG. 1B.

FIG. 1B is a block diagram of the inverter 140_1. The inverter 140_1 includes an electronic network 148_1 and a capacitor network 147_1. The output of the inverter 140_1 is connected to the load 102_1. The input of the inverter 140_1 includes a local DC bus 142_1, which has a high side DC+ and a low side DC−. The capacitor network 147_1 is connected across the local DC bus 142_1. In other words, the capacitor network 147_1 is connected to the high side DC+ and to the low side DC−. FIG. 1C is a block diagram of the electronic network 148_1. The electronic network 148_1 includes controllable switching elements SW1 to SW6, which are, for example, insulated gate bipolar transistors (IGBT). The switches SW1 to SW6 are arranged to form an H-bridge.

The other N inverters 140 are configured in the same manner. In other words, the inverters 140_1 to 140_N each include a respective local DC bus 142_1 to 142_N, a respective capacitor network 147_1 to 147_N, and a respective electronic network 148_1 to 148_N configured as shown in FIGS. 1B and 1C.

Under typical conditions, all of the local DC buses 142_1 to 142_N are connected to the common DC bus 110, and the N inverters 140 are powered by the common DC bus 110. However, under some conditions, one or more of the inverters 140 can be disconnected from the drive system 100, for example, for maintenance or replacement and are then reconnected to the system 100, or the operator of the drive system 100 determines that an additional inverter 140 should be added to the drive system 100. The pre-charge circuit 130 allows the capacitor network of such an individual inverter to be pre-charged prior to being connected to the common DC bus 110 without interrupting the operation of any of the inverters that are already connected to the DC bus 110.

For the purposes of providing an example of such a situation, the inverter 140_1 is powered off and disconnected from the common DC bus 110 for repair. All of the other N inverters 140 remain operational, remain connected to the DC bus 110, and continue to receive electrical power from the common DC bus 110. When the repair of the inverter 140_1 is completed, the operator of the drive system 100 wishes to reconnect the inverter 140_1 to the common DC bus 110. When the inverter 140_1 is in an off state (for example, not connected to the common DC bus 110), the voltage across the capacitor 147_1 is zero. However, the voltage across the common DC bus 110 is not zero because the common DC bus 110 is continuing to provide power to the other N inverters 140. If the inverter 140_1 were to be connected to the common DC bus 110 immediately after being in the off state, in-rush currents could occur in the capacitor network 147_1. Such in-rush currents may be damaging and it is thus desirable to avoid their formation or mitigate the amount of in-rush currents that occur.

The pre-charge circuit 130 is used to ramp up or increase the voltage of the capacitor network 147_1 prior to connecting the local DC bus 142_1 to the common DC bus 110 such that in-rush currents that could otherwise occur in the capacitor network 147_1 are mitigated or eliminated. Continuing with the example above, to bring the inverter 140_1 back into service, the inverter 140_1 is first connected to the pre-charge circuit 130 and is not connected to the common DC bus 110. The local DC bus 142_1 receives electrical power from the pre-charge circuit 130 and the voltage across the capacitor network 147_1 ramps up or increases. When the voltage across the capacitor network 147_1 is the same as the voltage across the common DC bus 110 or is different by less than a threshold amount, the local DC bus 142_1 is disconnected from the pre-charge circuit 130 and is connected to the common DC bus 130. The inverter 142_1 is then operational and may produce the drive signal 104_1.

By first connecting the local DC bus 142_1 to the pre-charge circuit 130 and allowing the voltage across the capacitor 147_1 to ramp up gradually prior to connecting the local DC bus 142_1 to the common DC bus 110, in rush currents that could otherwise occur in the capacitor 147_1 are mitigated or eliminated. Furthermore, while the inverter 142_1 is connected to the pre-charge circuit 130, all of the other N inverters 140 remain connected to the common DC bus 110. Thus, there is no service interruption for the other N inverters 140 and the drive system 100 operates in a fault-tolerant manner.

Some prior motor drive systems employ a common DC bus but also include a pre-charge circuit for the local DC bus of each inverter. On the other hand, the drive system 100 does not include an instance of the pre-charge circuit 130 for each local DC bus 142_1 to 142_N of the respective inverters 140_1 to 140_N, and each local DC bus 142_1 to 142_N of the N inverters 140 does not have its own dedicated pre-charge circuit. Instead, the pre-charge circuit 130 may be electrically connected to any of the local DC buses 142_1 to 142_N.

By using the single pre-charge circuit 130 for more than one of the local DC buses 142_1 to 142_N, the drive system 100 is simpler and less expensive than a design that uses a dedicated pre-charge circuit for the local DC bus of each inverter. For example, compared to a drive system that has a dedicated pre-charge circuit for the local DC bus of each inverter, the drive system 100 has simpler wirings and fewer components. Moreover, even though the drive system 100 includes the single pre-charge circuit 130, the drive system 100 is still able to operate in a fault-tolerant manner. Furthermore, the configuration of the drive system 100 allows one or more of the N inverters 140 to be disconnected from the common DC bus 110 while the other of the N inverters 140 remain connected to the common DC bus 110.

Figure 7:
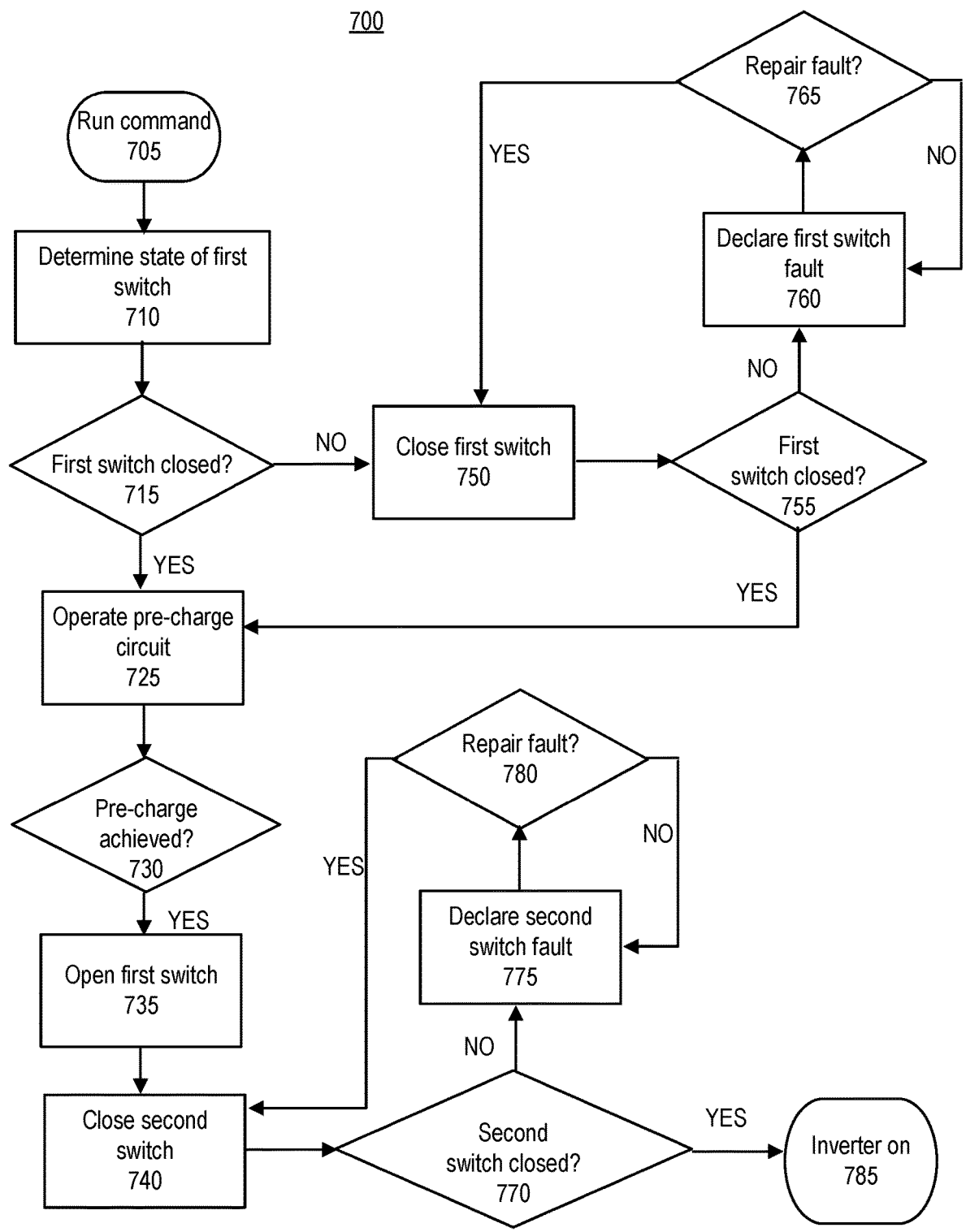
FIGS. 7-9 are flow charts of various example processes.
Figure 8:
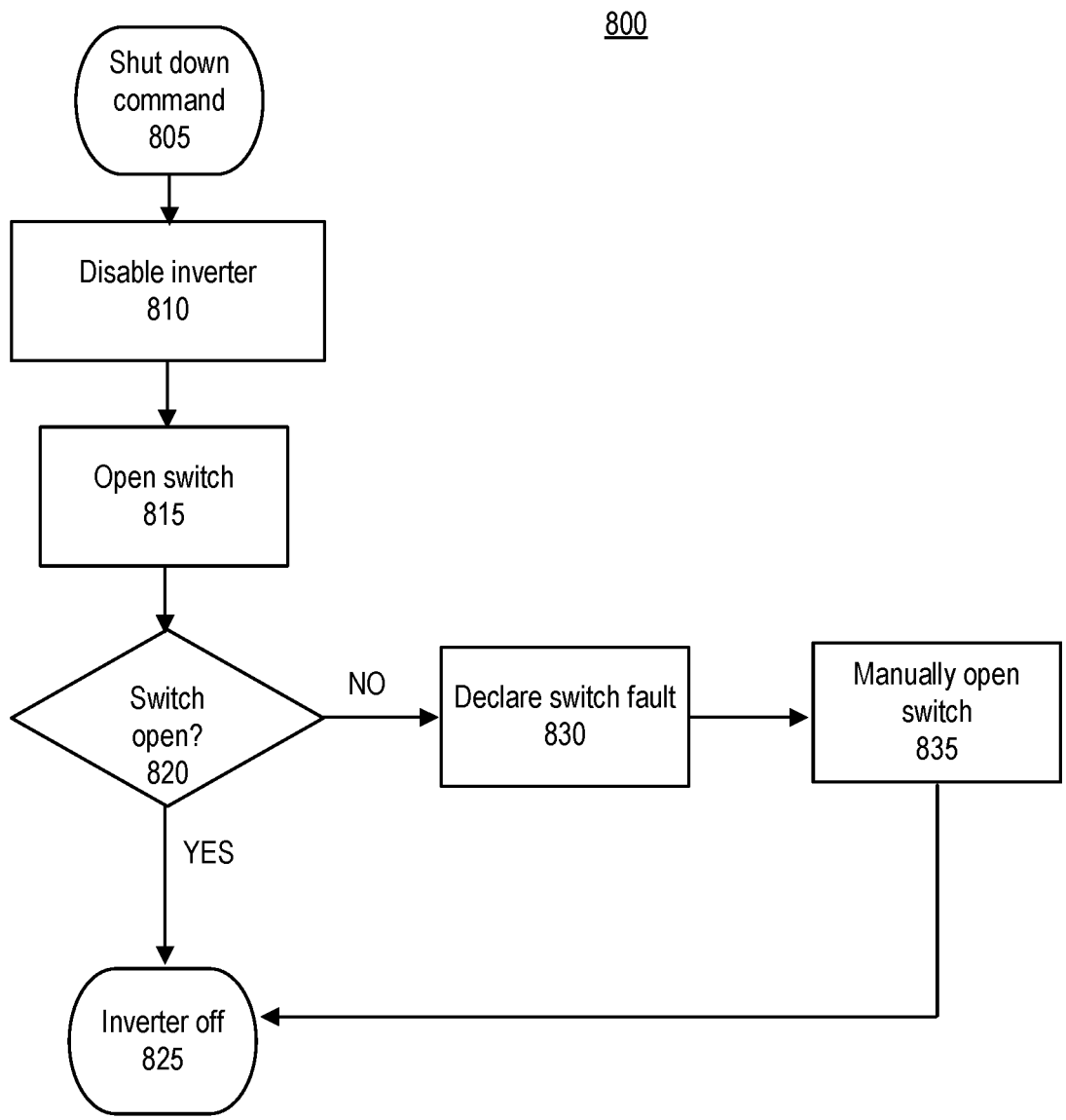
Figure 9:
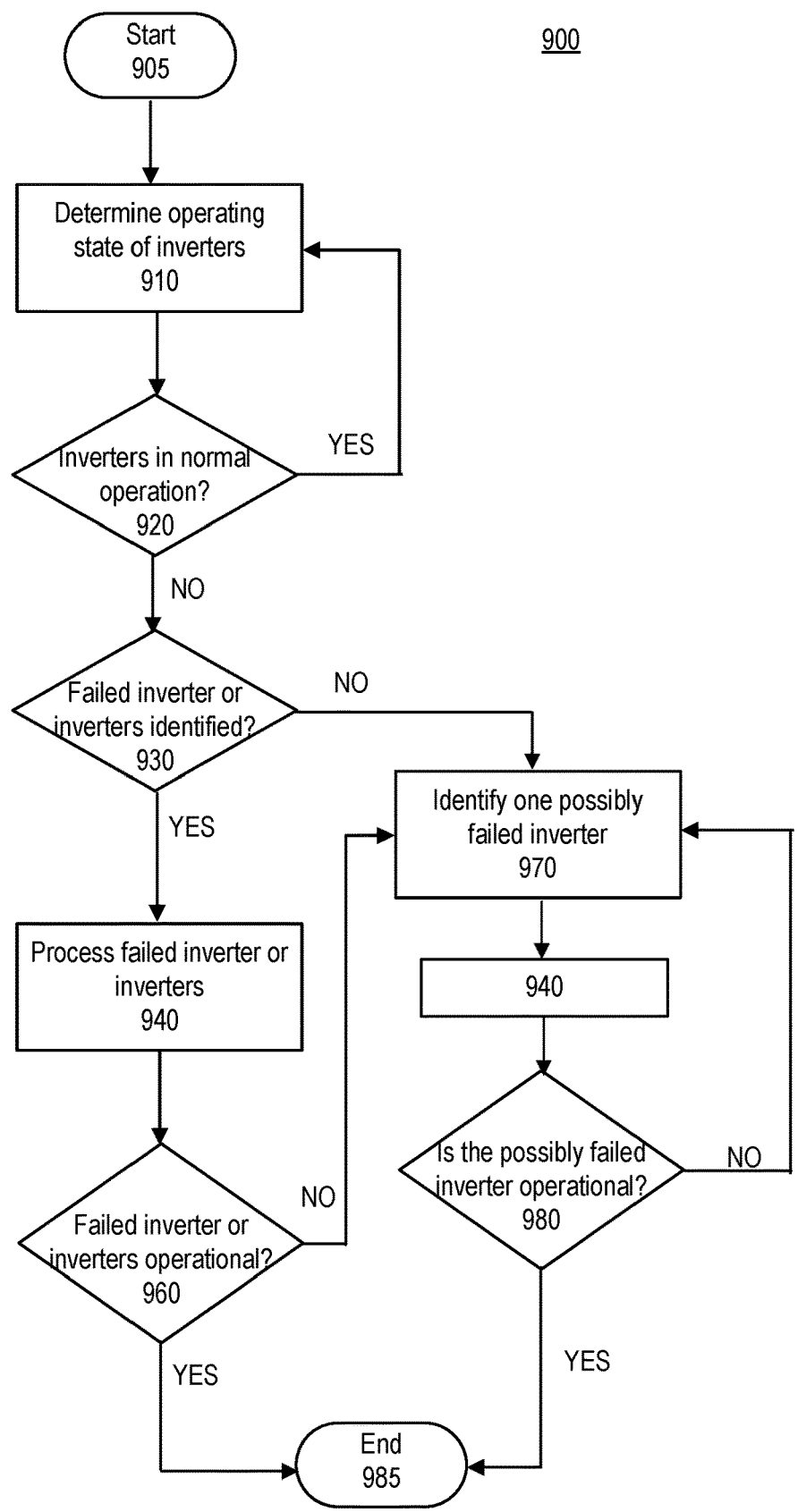

FIGS. 2A, 3, 4, 5C-5E, and 6 are schematics of various implementations of drive systems that include a pre-charge circuit such as the pre-charge circuit 130. FIGS. 7-9 show various examples of processes for operating such a drive system.

Figure 2A:
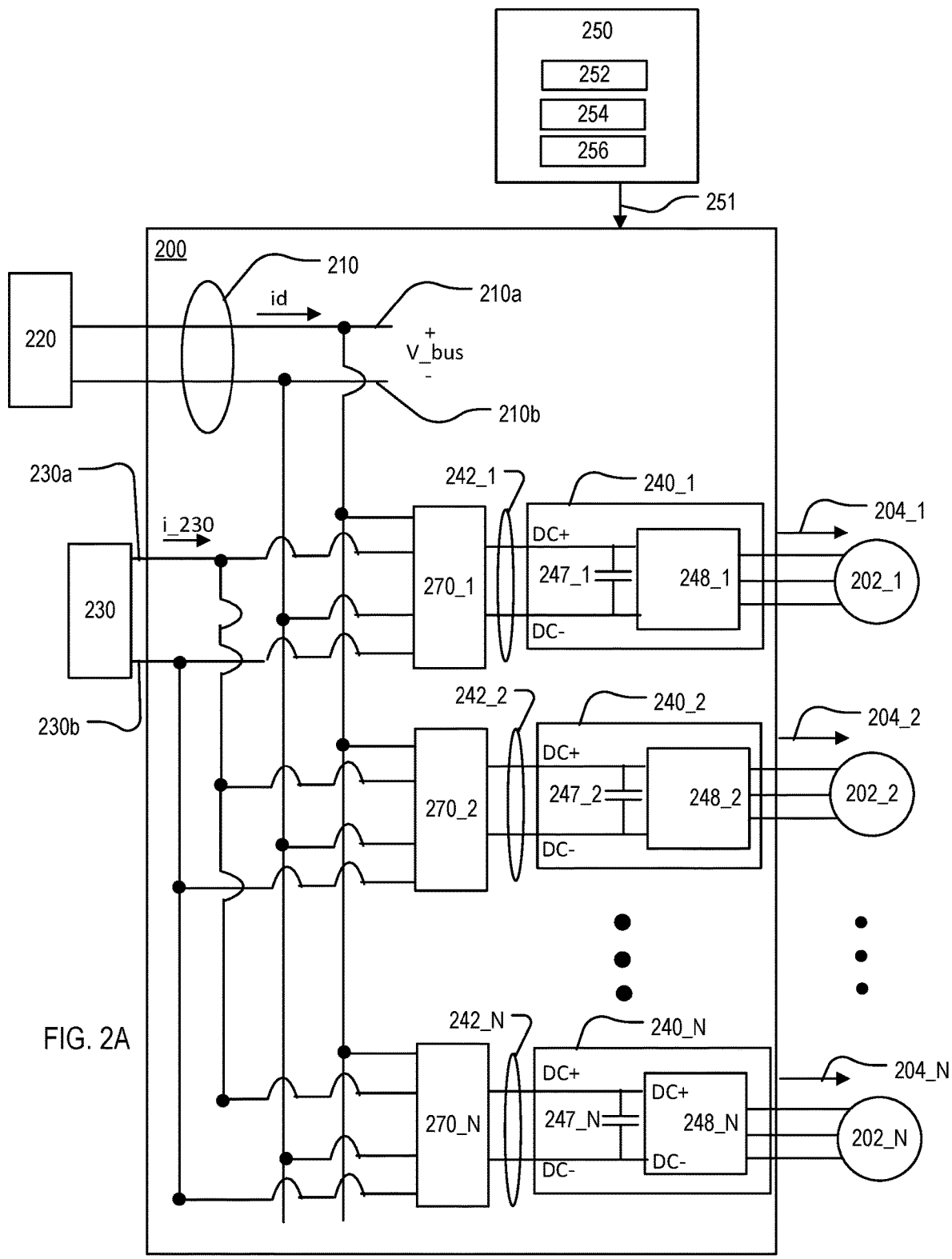
FIG. 2A shows another example implementation of a drive system.

FIG. 2A is a schematic diagram of a drive system 200. The drive system 200 includes inverters 240_1 to 240_N, where N is an integer number that is greater than one. The inverters 240_1 to 240_N are referred to collectively as the N inverters 240. Each inverter 240_1 to 240_N has a respective local DC bus 242_1 to 242_N, a respective electronic network 248_1 to 248_N, and a respective capacitor network 247_1 to 247_N. Each of the capacitor networks 247_1 to 247_N are connected across the respective local DC bus 242_1 to 242_N. The drive system 200 also includes a pre-charge circuit 230, which includes output nodes 230a and 230b. The pre-charge circuit 230 provides a DC output current at the output nodes 230a and 230b. The DC output current is used to ramp up or increase the voltage of any of the local DC buses 242_1 to 242_N before connecting that local DC bus to a common DC bus 210, as discussed in more detail below. The pre-charge circuit 230 may include any type of electronic components arranged in any configuration that results in a DC output. Examples of various pre-charge circuits are shown with respect to FIGS. 3, 4, and 6.

Figure 2B:
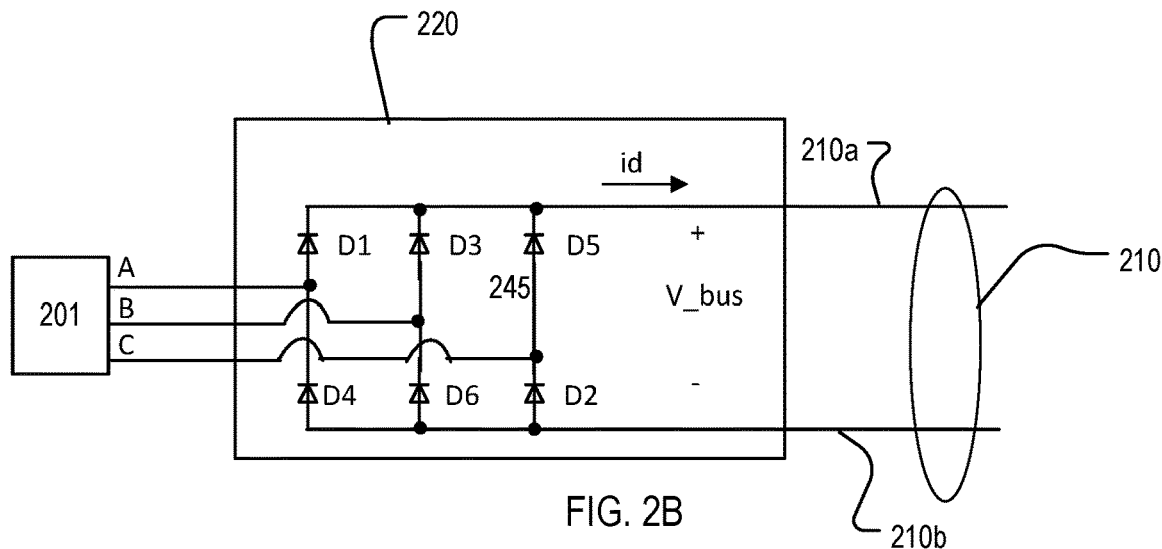
FIG. 2B shows an example of a converter.

Referring also to FIG. 2B, the common DC bus 210 receives DC power from a converter 220. The converter 220 receives three-phase AC electrical power from an AC electrical source 201. The AC electrical source 201 may be, for example, a high-voltage electrical distribution system such as an AC electrical grid that distributes AC electrical power having a fundamental frequency of, for example, 50 or 60 Hertz (Hz) and has an operating voltage of up to 690V. In another example, the AC electrical source 201 may be a generator. In the example of FIG. 2B, the AC electrical source 201 has three phases, which are referred to as A, B, and C. The common DC bus 210 includes a high side 210a and a low side 210b. The potential difference between the high side 210a and the low side 210b is referred to as the bus voltage (V_bus).

The converter 220 is any type of electrical network that is capable of converting AC electrical power to DC electrical power. In the example of FIG. 2B, the converter 220 is a three-phase six-pulse bridge front-end rectifier that includes diodes D1 to D6. Each diode D1 to D6 includes a cathode and an anode and is associated with a forward bias voltage. Each diode D1 to D6 allows current to flow in the forward direction (from the anode to the cathode) when voltage of the anode is greater than the voltage of the cathode by at least the bias voltage. When the voltage difference between the anode and the cathode is less than the forward bias voltage, the diode does not conduct current in the forward direction. The A phase of the AC source 201 is electrically connected to the anode of the diode D1 and the cathode of the diode D4. The B phase of the AC source 201 is electrically connected to the anode of the diode D3 and the cathode of the diode D6. The C phase of the AC source 201 is electrically connected to the anode of the diode D5 and the cathode of the diode D2. The diodes D1 to D6 rectify the input currents from the respective phases into a DC current id that flows on the common DC bus 210. Other implementations are possible. For example, the converter 220 may be an active front end rectifier or various single-phase rectifier front end circuits.

Figure 2C:
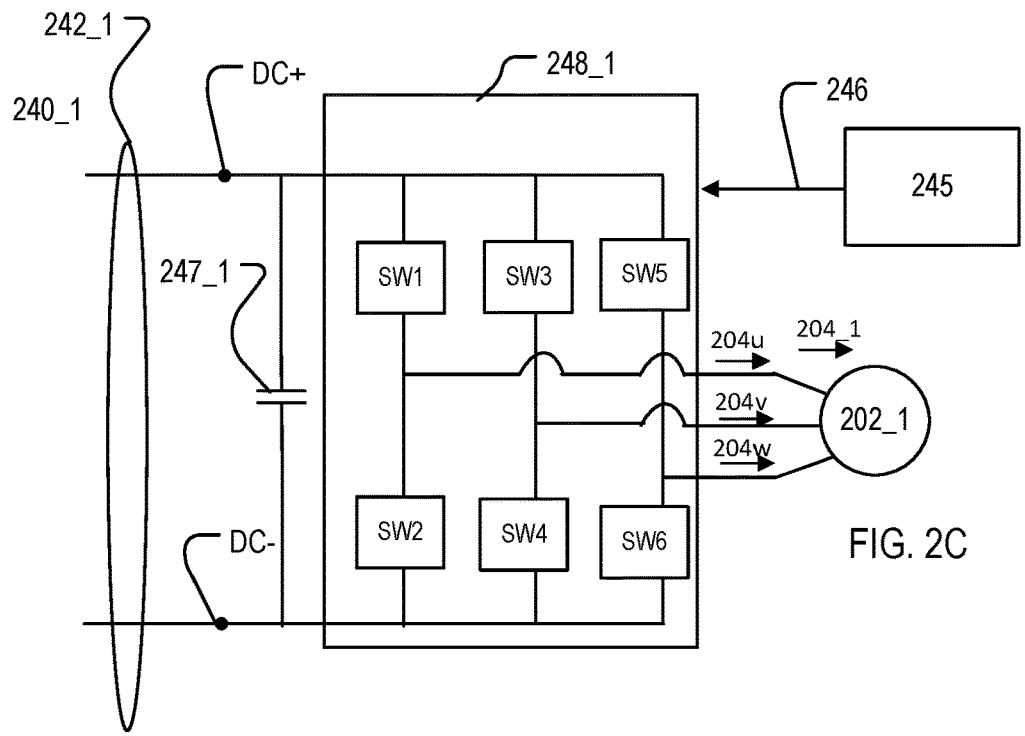
FIG. 2C shows another example of an inverter.

Referring also to FIG. 2C, an example configuration of the inverter 240_1 is shown. The same configuration may be used for the other N inverters 240. The inverter 240_1 includes a network 248_1 of electronic switches SW1 to SW6 that are connected across the local DC bus 242_1. The local DC bus 242_1 has a high side DC+ and a low side DC−. The inverter 240_1 also includes the capacitor network 247_1 that is connected across the local DC bus 242. In other words, the capacitor network 247_1 is connected to the high side DC+ and to the low side DC−. The capacitor network 247_1 includes one or more capacitors.

Each electronic switch SW1 to SW6 may be, for example, an insulated gate bipolar transistor (IGBT) and/or another type of controllable switch. The electronic switches SW1 to SW6 are arranged such that the inverter 240_1 generates an AC drive signal 204_1 from the DC power provided to the local DC bus 242_1. For example, the local DC bus 242_1 may receive DC power from the common DC bus 210. The inverter 240_1 modulates the DC power into the three-phase AC drive signal 204_1. The three-phase AC drive signal 204_1 has phase components 204u, 204v, 204w. Each phase 204u, 204v, and 204w is a train of voltage pulses that have an amplitude sufficient to operate the load 202_1. The switching frequency of the three-phase AC drive signal 204_1 may vary between, for example, 1 kHz and 20 kHz, with the upper limit of the frequency being determined by the limit of the switching speed of the electronic components SW1 to SW6, as well as system thermal and performance requirements.

The inverter 240_1 may implement, for example, a pulse width modulation (PWM) technique to modulate the DC power on the local DC bus 242_1 into the three-phase AC drive signal 204_1. The PWM technique may be implemented based on any type of control algorithm, such as, for example, a 6-step electronic commutation, various field oriented controls, a space vector PWM, or a sinusoidal PWM. The PWM technique may be implemented by a control system 245 or by a control system 250 (FIG. 2A). In the example shown, the control system 245 produces a gating control signal 246 (which consists of 6 gate signals, one per switch) that controls the switching of the electronic switches SW1 to SW6. The gating control signal 246 controls the switching of the electronic switches SW1 to SW6 such that the DC power at the local DC bus 242_1 is modulated into the drive signal 204_1. The amplitude, frequency, and phase of the drive signal 204_1 determine the operating properties of the load 202_1 (for example, a motor) such that providing the drive signal 204_1 to the motor 202_1 causes the motor 202_1 to operate at a particular torque and/or speed, and/or in a particular direction. In other examples, the control system 250 generates the gating control signal 245.

Figure 2D:
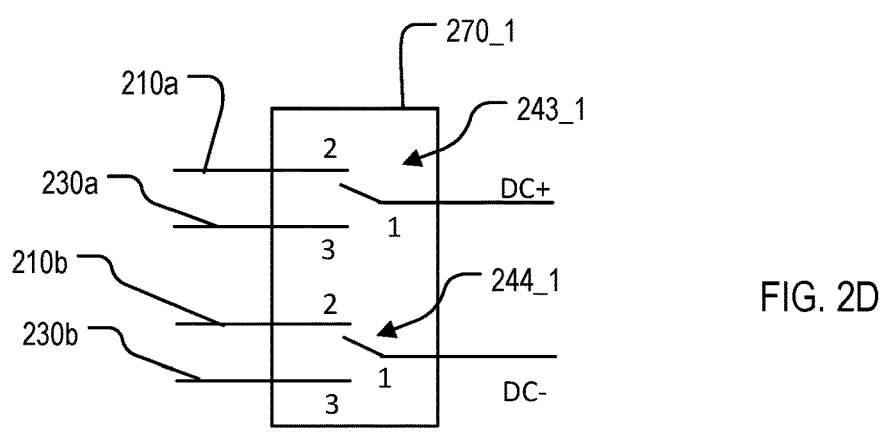
FIG. 2D shows an example of a switch assembly.

Referring again to FIG. 2A, each inverter 240_1 to 240_N is associated with a respective switch assembly 270_1 to 270_N, as discussed below. FIG. 2D is a block diagram of the switch assembly 270_1. The switch assembly 270_1 includes two switch components 243_1 and 244_1. The switch components 243_1 and 244_1 may be implemented with various devices, such as, for example, contactors, relays, or transistors. Each switch component 243_1 and 244_1 includes terminals 1, 2, 3. The high side DC+ of the local DC bus 242_1 is electrically connected to terminal 1 of the switch component 243_1. Terminal 2 of the switch component 243_1 is electrically connected to the high side 210*a* of the common DC bus 210. Terminal 3 of the switch component 243_1 is electrically connected to the output terminal 230*a* of the pre-charge circuit 230. The low side DC− of the local DC bus 242_1 is electrically connected to terminal 1 of the switch component 244_1. Terminal 2 of the switch component 244_1 is electrically connected to the low side 210*b* of the common DC bus 210. Terminal 3 of the switch component 244_1 is electrically connected to the output node 230*b* of the pre-charge circuit 230.

When terminal 1 of the switch component 243_1 is electrically connected to terminal 2 of the switch component 243_1 and terminal 1 of the switch component 244_1 is electrically connected to terminal 2 of the switch component 244_1, the local DC bus 242_1 is electrically connected to the common DC bus 210. When terminal 1 of the switch component 243_1 is electrically connected to terminal 3 of the switch component 243_1 and terminal 1 of the switch component 244_1 is electrically connected to terminal 3 of the switch component 244_1, the local DC bus 242_1 is electrically connected to the pre-charge circuit 230.

The state of the switch components 243_1 and 244_1 is controlled by the control system 250. The control system 250 produces a control signal 251, which is provided to switch components 243_1 and 244_1 to cause the components to change state. The other N switch assemblies 270 also include two switch components and are also configured and arranged in the manner shown in FIG. 2D.

The control system 250 includes an electronic processing module 252, an electronic storage 254, and an input/output (I/O) interface 256. The electronic processing module 252 includes one or more electronic processors. The electronic processors of the module 252 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 254 may be any type of electronic memory that is capable of storing data and instructions in the form of computer programs or software, and the electronic storage 254 may include volatile and/or non-volatile components. The electronic storage 254 and the processing module 252 are coupled such that the processing module 252 is able to access or read data from and write data to the electronic storage 254.

The electronic storage 254 stores instructions that, when executed, cause the electronic processing module 252 to analyze data and/or retrieve information. For example, the electronic storage 254 may store information instructions, that when executed, compare the measured values of a local DC bus of an inverter to the expected or measured value of V_bus. The electronic storage 254 also may store instructions, for example, in the form of a computer program, that are used to implement the PWM control or other control technique for the inverters 240_1 to 240_2. For example, the electronic storage 254 may store instructions that, when executed, generate the gating control signal 264. The electronic storage 254 may store instructions, for example, in the form of a computer program, function, or subroutine, that implement the processes discussed in FIGS. 7-9.

The electronic storage 254 also may store information about the system 200. The electronic storage 254 also may store information about the typical or expected ranges of various characteristics (for example, amplitude, frequency, and/or phase) of the drive signals 204_1 to 204_N during normal operation.

The I/O interface 256 may be any interface that allows a human operator and/or an autonomous process to interact with the control system 250. The I/O interface 256 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 256 also may allow communication without physical contact through, for example, an IEEE 802.11, Bluetooth, or a near-field communication (NFC) connection. The control system 250 may be, for example, operated, configured, modified, or updated through the I/O interface 256.

The I/O interface 256 also may allow the system 200 to communicate with systems external to and remote from the system 200. For example, the I/O interface 256 may include a communications interface that allows communication between the control system 250 and a remote station (not shown), or between the control system 250 and a separate monitoring apparatus. The remote station or the monitoring apparatus may be any type of station through which an operator is able to communicate with the control system 250 without making physical contact with the control system 250. For example, the remote station may be a computer-based work station, a smart phone, tablet, or a laptop computer that connects to the motor control system 250 via a services protocol, or a remote control that connects to the control system 250 via a radio-frequency signal.

Figure 3:
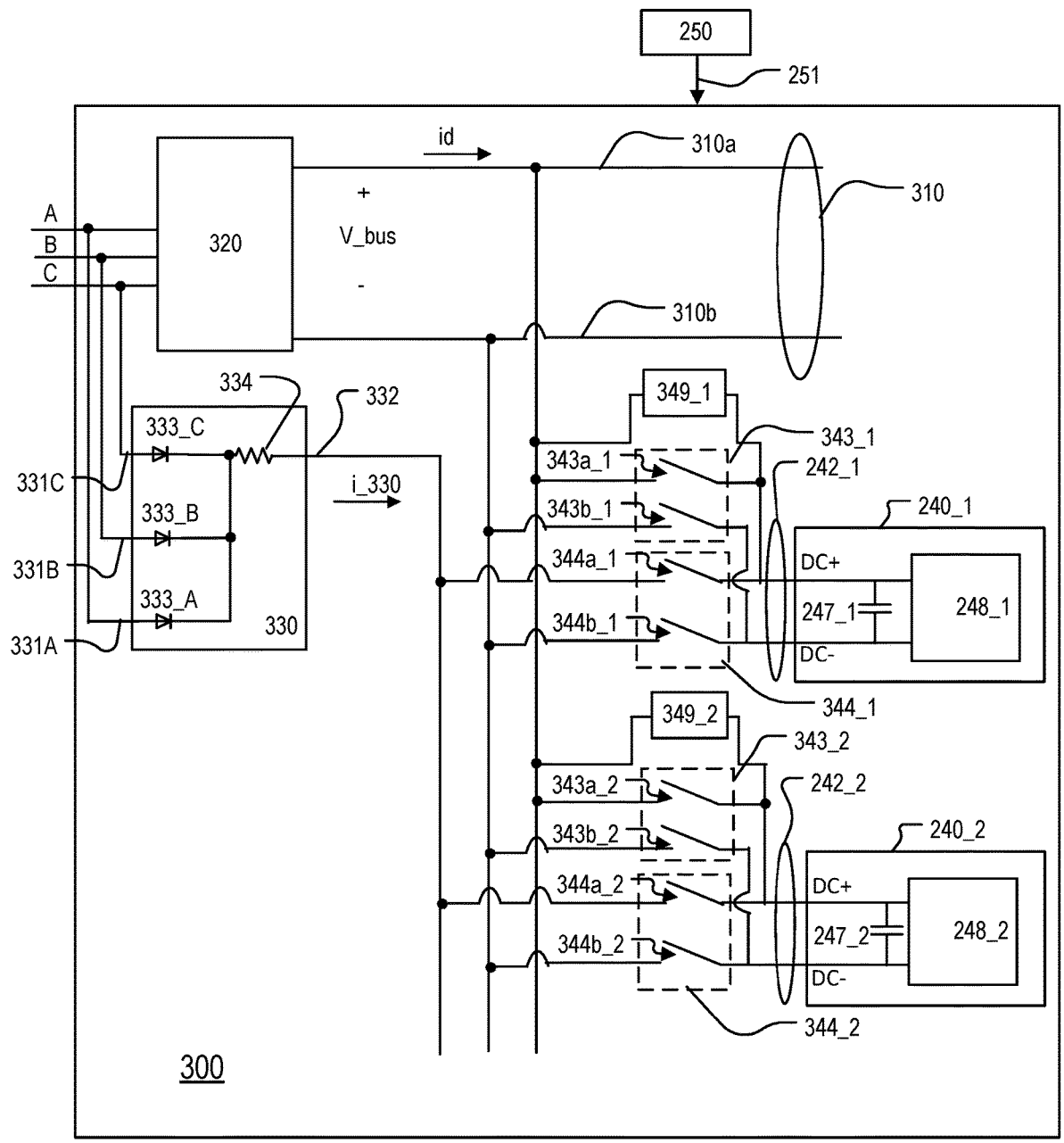
FIG. 3 shows another example implementation of a drive system.

FIG. 3 is a schematic of another example drive system 300. The drive system 300 includes a converter 320, a pre-charge circuit 330, and the N inverters 240. In the example of FIG. 3, N is two and the inverters 240_1 and 240_2 are shown. The drive system 300 may include more than two inverters. The converter 320 receives a three-phase AC input and produces a DC output at a common DC bus 310. The converter 320 may be configured as shown in FIG. 2B or in any other manner known in the art.

The common DC bus 310 includes a high side 310*a* and a low side 310*b*. The potential difference between the high side 310*a* and the low side 310*b* is the voltage across the common DC bus 310 or the common DC bus 310 voltage and is referred to as V_bus. The current that flows on the common DC bus 310 is id. The common DC bus 310 may be electrically connected to any or all of the N inverters 240.

The pre-charge circuit 330 includes input nodes 331A, 331B, 331C, and an output node 332. The pre-charge circuit 330 is configured to provide a DC current (labeled as i_330) to any inverter connected to the output node 332 before that inverter is connected to the common DC bus 310. The pre-charge circuit 330 mitigates or eliminates in-rush currents that could otherwise occur in the capacitor network 247_1 or 247_2.

Each input node 331A, 331B, 331C is electrically connected to one of the phases of the AC source. Thus, the pre-charge circuit 330 receives an AC input. In the example shown, the input node 331A is electrically connected to the A phase, the input node 331B is electrically connected to the B phase, and the input node 331C is electrically connected to the C phase. The pre-charge circuit 330 includes rectification elements 333A, 333B, and 333C and an impedance 334. Each rectification element 333A, 333B, 333C is any element capable of converting AC electrical power to DC electrical power. In the example shown, each rectification element 333A, 333B, 333C is a diode with its anode electrically connected to one phase of the AC source and its cathode electrically connected to the impedance 334. The impedance 334 is used to reduce the magnitude of current that flows from the output node 332.

In the example of FIG. 3, the impedance 334 is a resistor. However, other electronic elements that are capable of reducing the current that flows from the output node 332 may be used. Moreover, although the rectification elements 333A, 333B, 333C and the impedance 334 are illustrated as each including a single element, any of the rectification element 333A, 333B, 333C and/or the impedance 334 may include more than one element and may be a network of connected electrical elements. Furthermore, implementations other than that shown in FIG. 3 are possible. For example, the pre-charge circuit 330 may be connected to fewer than all of the phases A, B, and C. The pre-charge circuit 330 may be connected to any two of the phases A, B, C or any one of the phases A, B, C.

The drive system 300 also includes switching apparatuses 343_1, 343_2, 344_1, and 344_2. Each of the switching apparatuses 343_1, 343_2, 344_1, and 344_2 has an open state and a closed state. The state of the switching apparatuses 343_1, 343_2, 344_1, and 344_2 may be controlled with a controller such as the control system 250 (FIG. 2A). Each switching apparatus 343_1, 343_2 controls an electrical connection between the respective inverter 240_1, 240_2 and the common DC bus 310. Each switching apparatus 344_1, 344_2 controls an electrical connection between the respective inverter 240_1, 240_2 and the pre-charge circuit 330.

Each of the switching apparatuses 343_1, 343_2, 344_1, and 344_2 includes switches or switch components. For example, the switching apparatus 343_1 includes switches 343*a*_1 and 343*b*_1. When the switches 343*a*_1 and 343*b*_1 are closed, the switching apparatus 343_1 is in the closed state, and the inverter 240_1 is electrically connected to the common DC bus 310. When the switches 343*a*_1 and 343*b*_1 are open, the switching apparatus 343_1 is in the open state, and the inverter 240_1 is electrically disconnected from the common DC bus 310.

The switching apparatus 344_1 includes switches 344*a*_1 and 344*b*_1. When the switches 344*a*_1 and 344*b*_1 are closed, the switching apparatus 344_1 is in the closed state, and the inverter 240_1 is electrically connected to the pre-charge circuit 330. When the switches 344*a*_1 and 344*b*_1 are open, the switching apparatus 344_1 is in the open state, and the inverter 240_1 is electrically disconnected from the pre-charging circuit 330. The switching apparatuses 343_2 and 344_2 include respective switches 343*a*_2, 343*b*_2 and 344*a*_2, 344*b*_2, which are configured to connect the inverter 240_2 to either the common DC bus 310 or the pre-charge circuit 330 in the same manner.

The drive system 300 also includes sensors 349_1 and 349_2. In the example of FIG. 3, sensors 349_1 and 349_2 are voltage sensors. The sensor 349_1 measures a potential difference between the common DC bus 310 and the local DC bus 242_1. The sensor 349_2 measures a potential difference between the common DC bus 310 and the local DC bus 242_2.

Figure 4:
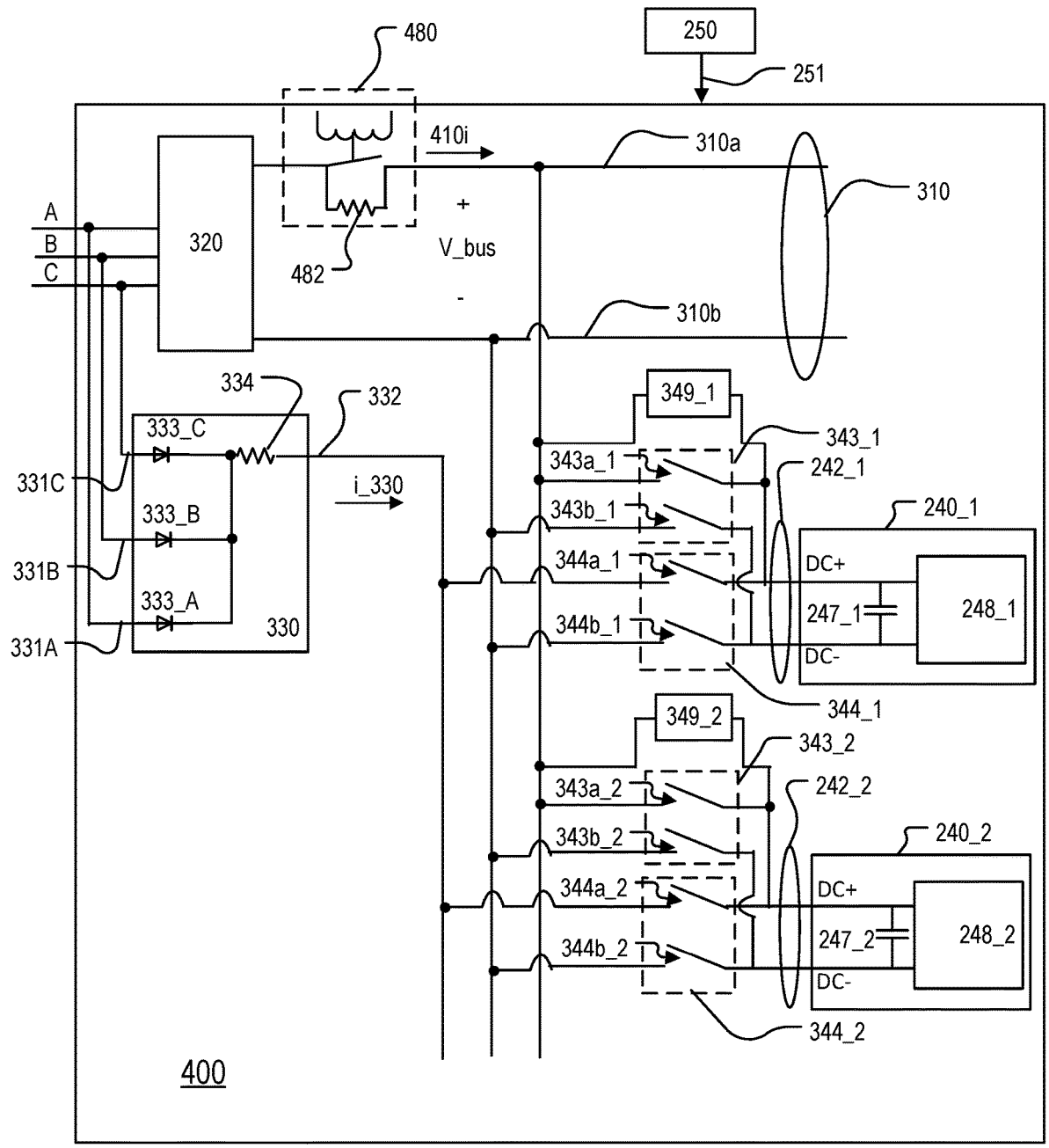
FIG. 4 shows another example implementation of a drive system.

FIG. 4 is a schematic of another example drive system 400. The drive system 400 is the same as the drive system 300 (FIG. 3), except the drive system 400 also includes a common pre-charge switch 480. The common pre-charge switch 480 is connected to the high side 310*a* of the common DC bus 310. The common pre-charge switch 480 includes a resistive element 482. When the common pre-charge switch 480 is in a first state (such as shown in FIG. 4), current 410*i* flows through the resistive element 482 to any inverter that is connected to the common DC bus 410. In a second state, the resistive element 482 is bypassed, and the current 410*i* does not flow through the resistive element 482.

Figure 5C:
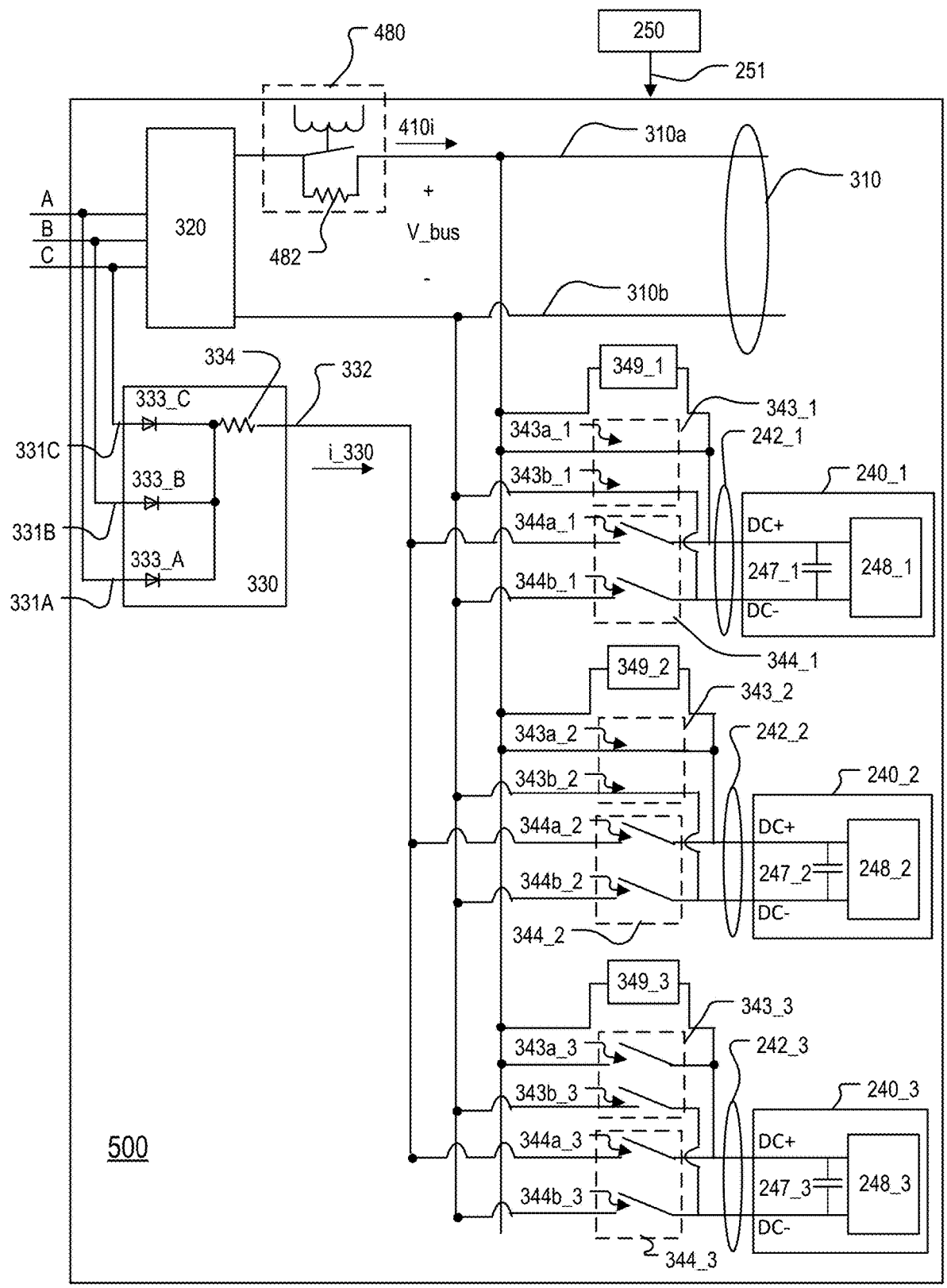
FIG. 5C shows another example implementation of a drive system.
Figure 5D:
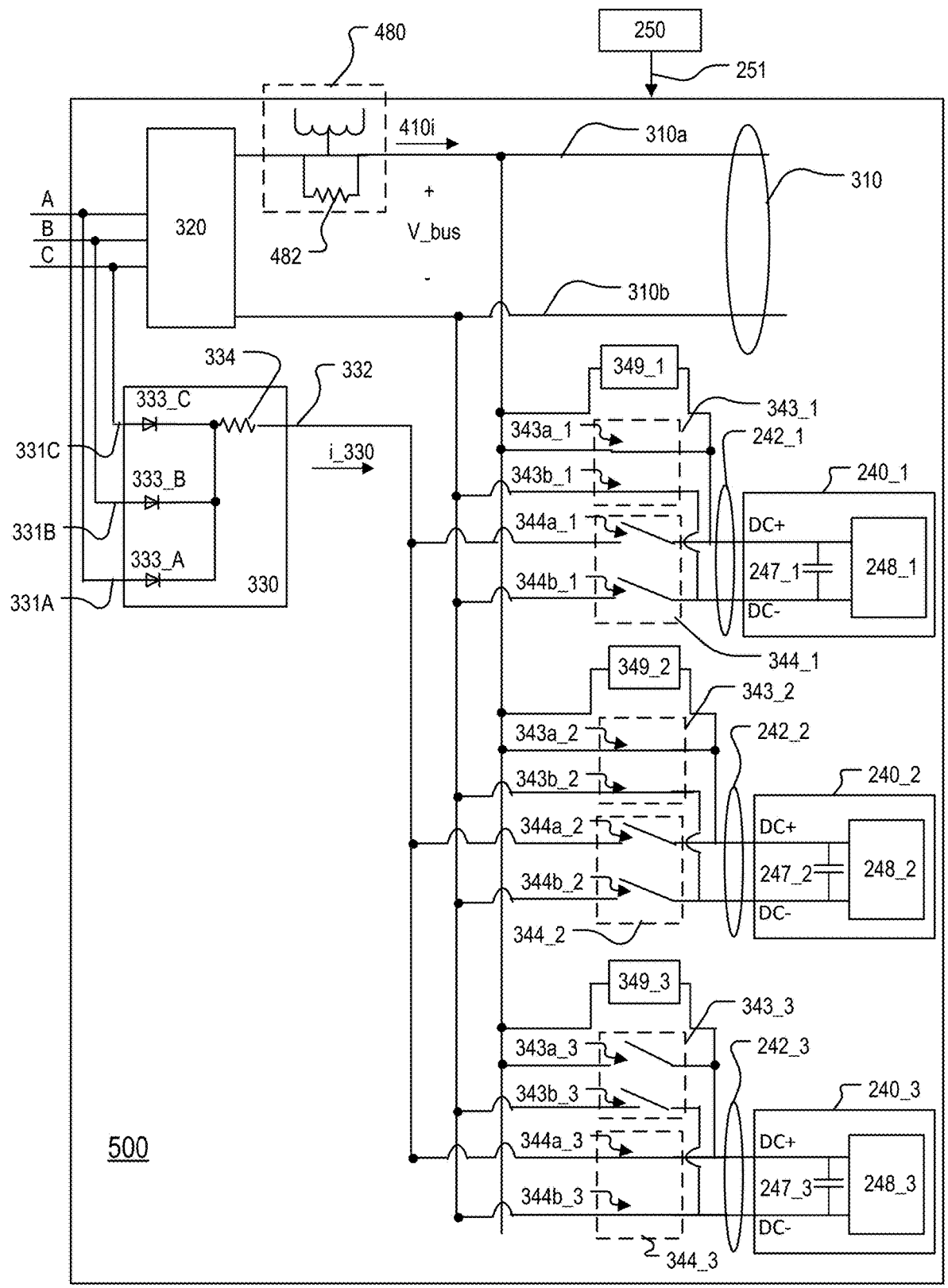
FIG. 5D shows another example implementation of a drive system.
Figure 5E:
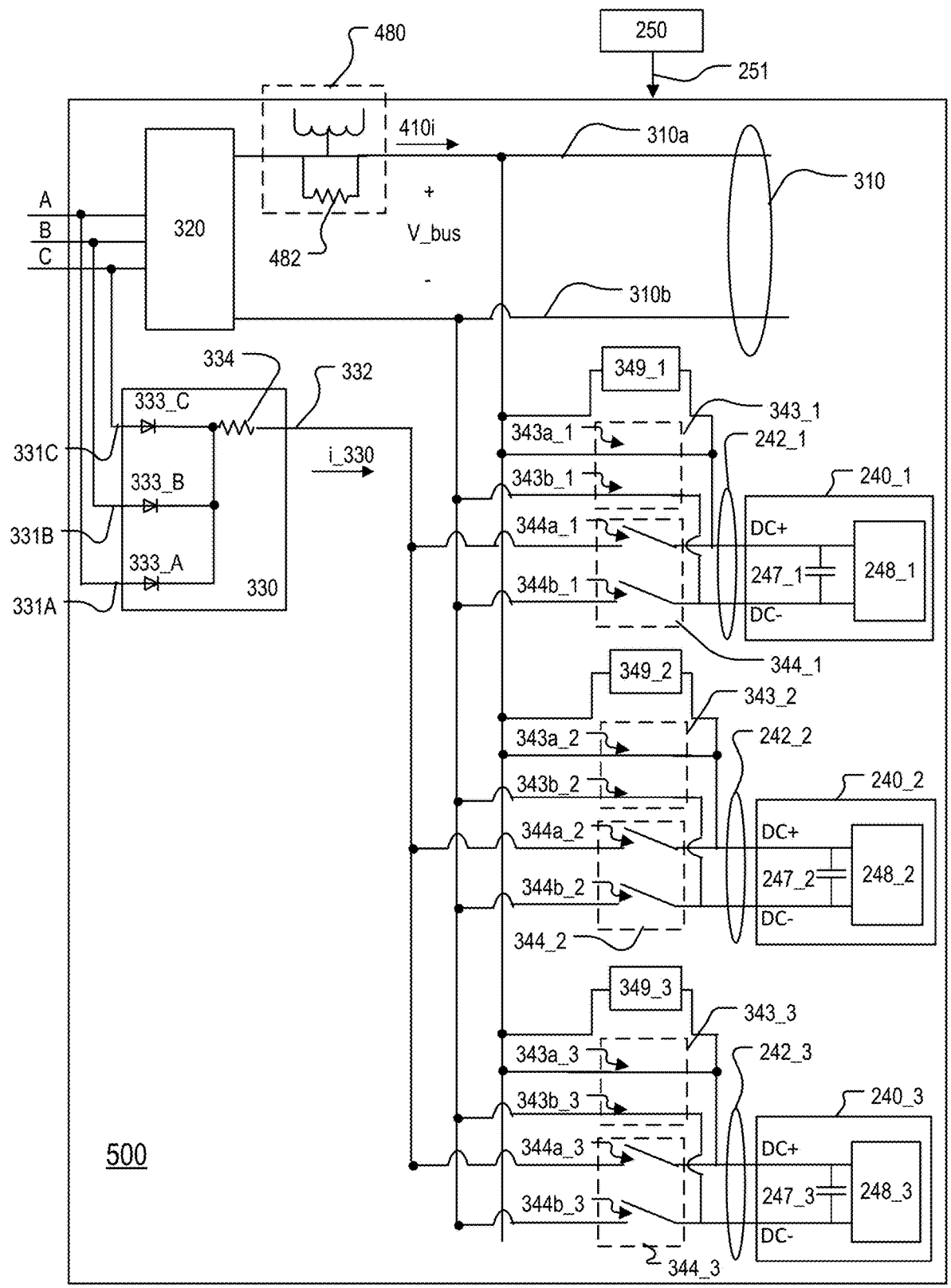
FIG. 5E shows another example implementation of a drive system.

FIGS. 5A and 5B show example data for a drive system 500 (FIGS. 5C-5E). The drive system 500 is the same as the drive system 400 (FIG. 4), except the drive system 500 includes three inverters: 240_1, 240_2, and 240_3. The data shown in FIGS. 5A and 5B relate to a scenario in which the third inverter 240_3 is added to the drive system 500 while the inverters 240_1 and 240_2 are on. FIG. 5A shows current as a function of time. FIG. 5B shows voltage as a function of time. FIGS. 5A and 5B begin at time 0 and include two time periods: a time period t1 and a time period t2 that occurs after the time period t1. The x-axis (the time axis) is the same in FIGS. 5A and 5B. FIG. 5C shows the drive system 500 during the time period t1. FIG. 5D shows the drive system 500 during the time period t2. FIG. 5E shows the drive system 500 immediately after the time period t2.

Immediately before the time period t1, the drive system 500 is in an off state (for example, when converter 320 is disconnected from the AC source), and the voltage of each of the capacitor networks 247_1 and 247_2 is zero. At time 0, the time period t1 begins. FIG. 5C shows the system 500 during the time period t1. The inverters 240_1 and 240_2 are connected to the common DC bus 310, and the common pre-charge switch 480 is in the first state. The capacitor networks 247_1 and 247_2 are pre-charged with the current 410*i*, which flows through the resistive element 482. The voltage of the capacitor networks 247_1 and 247_2 increases from 0 to a voltage V1, as shown by the plot labeled 547 in FIG. 5B. The voltage V1 is a pre-determined threshold voltage that is equal to or close to the expected steady-state value of V_bus. When the voltage of the each of the capacitor networks 247_1 and 247_2 reaches V1, the pre-charge circuit 480 is transitioned to the second state such that the current 410*i* flows in the DC common bus 310 and to the capacitor networks 247_1 and 247_2 without flowing in the resistive element 482. The voltage of the capacitor networks 247_1 and 247_2 rises to V_bus. The time period t1 ends, and the time period t2 can begin.

The time period t2 is shown on FIGS. 5A and 5B as occurring immediately after the time period t1. However, this is not necessarily the case. At the end of the time period t1, the inverters 240_1 and 240_2 are operational and may continue to operate for any amount of time until the inverter 240_3 is added to the drive system 500. Thus, in actual operation, there can be a period between the end of the time period t1 and the start of the time period t2, only when the additional inverter (the inverter 240_3 in this example) is ready to be connected to the common DC bus, then the time period t2 begins.

The current flowing to the third inverter 240_3 during the time period t1 is shown in the plot labeled i_330 in FIG. 5A. The voltage across the capacitor network 247_3 is shown in the plot labeled 547*x* in FIG. 5B. The third inverter 240_3 is offline and is not connected to the common DC bus 310 or the pre-charge circuit 330 during the time period t1. Thus, during the time period t1, no current flows to the capacitor network 247_3 of the inverter 240_3, and the voltage across the capacitor network 247_3 is 0, as shown in FIGS. 5A and 5B.

FIG. 5D shows the system 500 during the time period t2. The time period t2 begins when the additional inverter 240_3 is added to the drive system 500. For example, the time period t2 may be initiated due to a manual indication from an operator of the drive system 500 or based on a command from an automated process. The third inverter 240_3 is pre-charged by the pre-charge circuit 330 during the time period t2, while the inverters 240_1 and 240_2 remain connected to the DC bus 310 and continue to receive electrical power from the DC bus 310.

As shown in FIG. 5D, during the time period t2, the third inverter 240_3 is connected to the pre-charge circuit 330. The current i_330 flows from the pre-charge circuit 330 to the capacitor network 247_3. As shown in FIG. 5A, the magnitude of the current i_330 fluctuates within an exponentially decaying envelope during the time period t2. The fluctuations are due to the rectification performed by the pre-charge circuit 330. The voltage across the capacitor network 247_3 (shown as 547x in FIG. 5B) increases from 0 at the beginning of the time period t2 until it reaches a threshold voltage V2. After the capacitor network reaches a threshold voltage V2, the time period t2 ends. As shown in FIG. 5E, immediately after the second time period t2, the third inverter 240_3 is disconnected from the pre-charge circuit 330 and is connected to the common DC bus 310. The voltage across the capacitor network 247_3 becomes the same as the voltage across the common DC bus 310.

Thus, the third inverter 240_3 was connected to the drive system 500 and to the common DC bus 310 without interfering with the operation of the inverters 240_1 and 240_2 and while also minimizing or eliminating in-rush currents that otherwise could occur in the capacitor network 247_3. In the example above, the pre-charge circuit 330 acts as an auxiliary or supporting pre-charge circuit that allows inverters to be swapped out or replaced, or allows additional inverters to be added without interfering with the operation of inverters that are already being powered by the common DC bus 310.

The scenario discussed above is provided as an example, and other scenarios are possible. For example, any of the inverters 240_1 to 240_3 that are connected to the common DC bus 310 may be disconnected from the common DC bus 310 without disturbing the operation of the inverters that remain connected to the common DC bus 310. For instance, after the time period t2, all of the inverters 240_1 to 240_3 are connected to the common DC bus 310. Any of the inverters 240_1 to 240_3 may be removed from the common DC bus 310 by opening the respective switching apparatus 343_1 to 343_3. For example, if the inverter 240_2 has a fault condition, the control system 250 causes the switching apparatus 343_2 to open to thereby remove the inverter 240_2 from the common DC bus 310. The switching apparatus 344_2 remains open such that the inverter 240_2 is disconnected from the drive system 500. The other inverters 240_1 and 240_3 remain connected to the common DC bus 310 through the switching apparatus 343_1 and 343_3. The inverters 240_1 and 240_3 continue to be operational while the inverter 240_2 is removed from the common DC bus 310 and after the inverter 240_2 is removed from the common DC bus 310. An example of a process for removing an inverter from a drive system is discussed with respect to FIG. 8 below.

Figure 6:
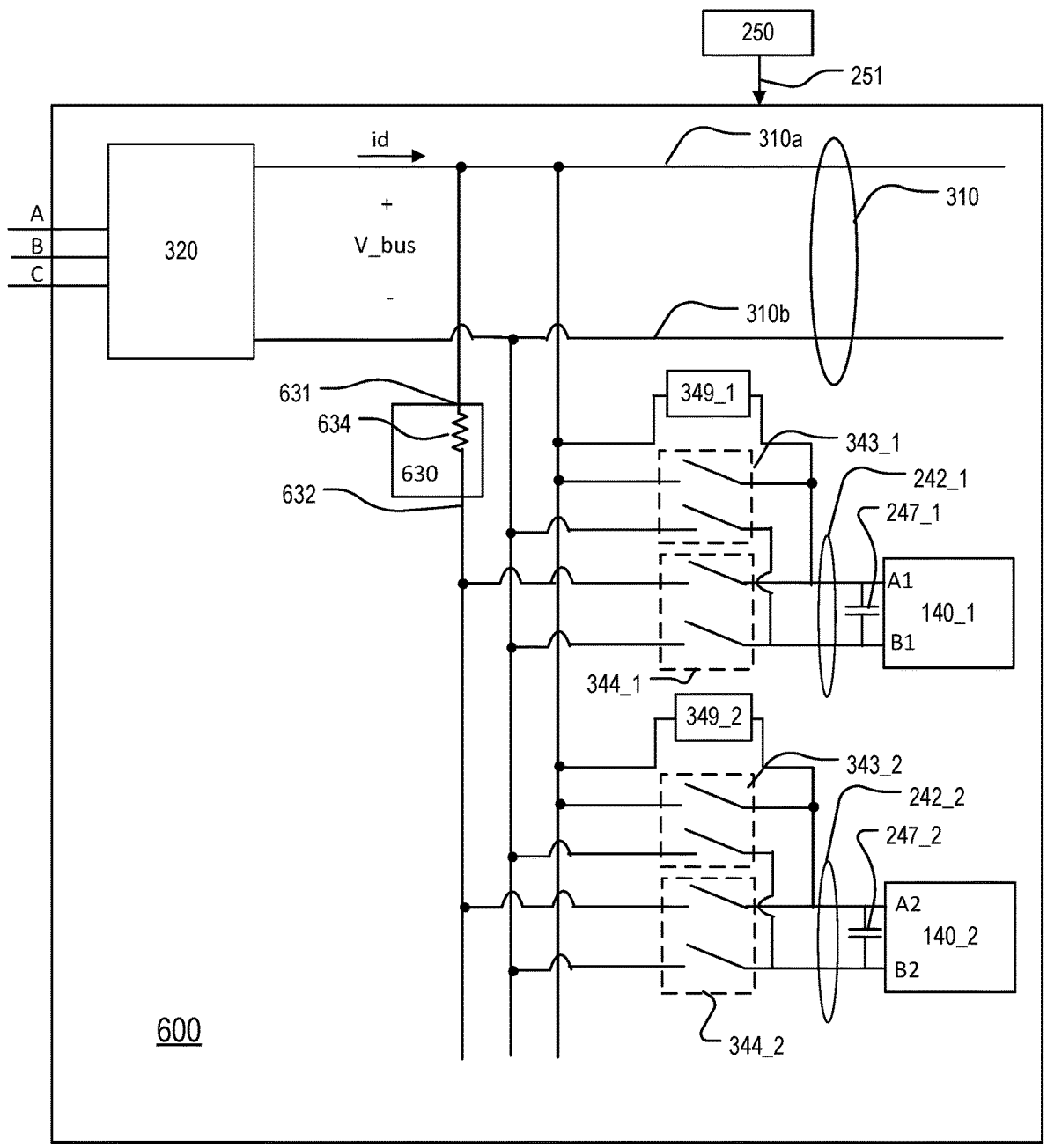
FIG. 6 shows another example implementation of a drive system.

FIG. 6 is a schematic of another example drive system 600. The drive system 600 is the same as the drive system 300 (FIG. 3), except the drive system 300 includes the pre-charge circuit 630 instead of the pre-charge circuit 330. The pre-charge circuit 630 includes an impedance 634 but does not include a rectification element. Instead, DC electrical power is provided directly to an input node 631 of the pre-charge circuit 630. In the example shown in FIG. 6, the input node 631 is electrically connected to the high side 310a of the common DC bus 310. The pre-charge circuit 630 includes an output node 632 that is electrically connected to the inverter 240_1 when the switching apparatus 344_1 is closed and/or is electrically connected to the inverter 240_2 when the switching apparatus 344_2 is closed.

FIG. 7 is a flow chart of a process 700. The process 700 is an example of a process for replacing an inverter or adding an inverter in a drive system that is already operating. The process 700 may be used with the system 100, 200, 300, 400, 500, or 600 but the process 700 is discussed with respect to the system 400 below. The process 700 may be performed by the processing module 252 of the control system 250.

The process 700 begins when a run command is received at the drive system 400 (705). The run command is a command that indicates that an inverter that is currently offline is to be added to the drive system 400. The run command may be received from an operator through the I/O interface 256. In some implementations, the run command is automatically generated without operator intervention. The run command may be received at the electronic processing module 252. In the example discussed below, the inverter 240_2 is offline and the inverter 240_1 is online and is connected to the common DC bus 310. In this example, the process 700 is used to connect the inverter 240_2 to the common DC bus 310.

After the run command is received, the control system 250 determines the state of a first switch that controls the connection between the inverter 240_2 and the pre-charge circuit 330 (715). In this example, the first switch is the switching apparatus 344_2. To perform (715), the control system 250 determines if the switching apparatus 344_2 is opened or closed. In some implementations, the control system 250 also determines the state of a second switch that controls the connection between the inverter 240_2 and the common DC bus 310 to ensure that the inverter 240_2 is not electrically connected to the common DC bus 310 at the time of initial start-up. In this example, the second switch is the switching apparatus 343_2 in this example. If the switching apparatus 343_2 is closed, the control system 250 causes the switches in the switching apparatus 343_2 to open. For example, the control system 250 may generate a command signal 251 that includes information sufficient to open the switches in the switching apparatus 343_2 that are closed.

If the switching apparatus 344_2 is closed, the current i_330 flows from the pre-charge circuit 330 to the capacitor network 247_2 of the inverter 240_2, and the pre-charge circuit 330 is thereby operated (725). The voltage at the capacitor network 247_2 begins to increase. The voltage difference between the common DC bus 310 and the local DC bus 242_2 of the inverter 240_2 is measured by the sensor 349_2.

The control system 250 analyzes the voltage measured at the sensor 349_2 to determine whether the capacitor network 247_2 has been sufficiently pre-charged (530). For example, a pre-charge condition threshold voltage that represents the minimum difference between the common DC bus voltage (V_bus) and an inverter local DC bus voltage may be stored on the electronic storage 254. The pre-charge condition threshold voltage may be a magnitude of a difference between the voltage across the common DC bus 310 (V_bus) and the voltage across the local DC bus 242_2. The value of the difference is selected to be a value that is small enough to not cause in-rush currents or to causes only relatively small in-rush currents. The threshold may be, for example, zero (0) volts (V), meaning that the pre-charge condition would be satisfied for an individual inverter if the voltage across the common DC bus 310 is the same as the voltage at the respective local DC bus of that inverter. Other values may be used for the threshold depending on the application, and the threshold may be a value that is not zero.

If the pre-charge condition has been achieved for the inverter 240_2, the control system 250 operates the switching apparatus 344_2 to disconnect the inverter 240_2 from the pre-charge circuit 330 (735). For example, the control system 250 may generate the command signal 251 and provide the command signal 251 to the switching apparatus 344_2. The command signal 251 in this example may be a voltage signal that is sufficient to cause the switches in the apparatus 344_2 to open. In this example, opening the switching apparatus 344_2 disconnects the inverter 240_2 from the pre-charge circuit 230.

The control system 250 issues a command to close the second switch, which is the switching apparatus 343_2 in this example (740). When the switching apparatus 343_2 is closed, the inverter 240_2 is electrically connected to the common DC bus 310, and the inverter 240_2 is on and produces the drive signal 204_2 (785). The inverter 240_1 remains connected to the DC common bus 310 during the process 700. The operation of the inverter 240_1 is not affected by the process 700.

After (705) to (740) are performed, the inverter 240_2 should have been pre-charged by the pre-charge circuit 330 and electrically connected to the common DC bus 310. However, issues may arise with the operation of the switching apparatus 344_2 or the switching apparatus 343_2. The process 700 checks for such issues, as discussed next.

Returning to (715), if the switching apparatus 344_2 is not determined to be closed based on (710), the control system 250 attempts to close the switching apparatus 344_2. The control system 250 determines whether the switching apparatus 344_2 is closed (755). If the switching apparatus 344_2 is closed, the process 700 returns to (725). If the switching apparatus 344_2 is not closed, the control system 250 declares that the switching apparatus 344_2 is in a fault condition (760). The control system 250 takes action to repair the fault condition in the switching apparatus 344_2 (765). For example, the control system 250 may issue a perceivable alert to an operator indicating that the switching apparatus 343_2 is in a fault condition and should be repaired or replaced. If the fault condition is not resolved, the process 700 returns to (760). If the fault condition is repaired, the process 700 returns to (750) and the control system 250 again attempts to close the switching apparatus 344_2.

The switching apparatus 343_2 is also tested for faults, as discussed next. After attempting to close the switching apparatuses 343_2 at (740), the control system determines whether the switching apparatus 343_2 is closed (770). If the switching apparatus 343_2 is not closed, the control system 250 declares a fault with the switching apparatuses 343_2 (775), and the control system 250 attempts to repair the fault (780). For example, the control system 250 may alert an operator such that a repair or replacement may be made. If the fault is repaired, the process 700 returns to (740). If the fault is not repaired, the process 700 returns to (775) until the fault is repaired.

The above example relates to connecting the inverter 240_2 to the common DC bus 310 while the inverter 240_1 remains connected to the common DC bus 310 and without interrupting the operation of the inverter 240_1. The process 700 may be applied to connect other inverters to the common DC bus 310.

Referring to FIG. 8, a flow chart of a process 800 is shown. The process 800 is an example of a process for shutting down one or more inverters in a drive system. The process 800 is discussed with respect to the drive system 400, but may be performed with other drive systems, such as the system 200 or the system 300. The process 800 may be performed by the control system 250.

A shut-down command is received (805). The shut-down command may be a command from an operator that is entered at the I/O interface 256. In another example, the shut-down command may be a command that is issued automatically due to, for example, one or more of the N inverters 240 exceeding its safe operating limits. In the example below, the inverter 240_1 and the inverter 240_2 are initially connected to the common DC bus 310. The inverter 240_2 is shut down.

The inverter 240_2 is disabled (810). The control system 250 attempts to open the switching apparatus 343_2 (815). Opening the switch apparatus 343_2 disconnects the inverter 240_2 from the common DC bus 310. The control system 250 determines whether or not the switching apparatus 343_2 is open (820). If the switching apparatus 343_2 is determined to be open, then the inverter 240_2 is off (825).

If the switching assembly 343_2 is not determined to be open at (820), then the control system 250 declares that the switch apparatus 343_2 is in a fault condition (830). The control system 250 then attempts to open the switching apparatus 343_2 manually (835). After opening the switching apparatus 343_2 manually, the inverter 240_2 is off and is considered shutdown (825). During the process 800, the inverter 240_1 remains connected to the common DC bus 310 and continues to operate without interruption.

The above example is discussed with respect to shutting down the inverter 240_2. In other examples, a different one of the N inverters 240 is shut down. In still other examples, more than one of the N inverters 240 are shut down simultaneously.

FIG. 9 is a flow chart of a process 900. The process 900 is an example of a process for troubleshooting process. The process 900 may be performed by the control system 250. The process 900 may be used to troubleshoot the drive system 100, 200, 300, 400, 500, or 600. To provide an example, the process 900 is discussed with respect to the drive system 400.

A troubleshoot command is received (905). The troubleshoot command may be received by the control system 250. For example, an operator of the system 300 may request troubleshooting manually through the I/O interface 256. In another example, the troubleshoot command may be automatically generated by the system 300 and provided to the control system 250 upon detection of a fault.

The N inverters 240 are assessed to determine the operating state of the N inverters 240 (910). The N inverters 240 may be assessed, for example, by analyzing the drive signals 204_1 to 204_N to determine if the drive signals 204_1 to 204_N have characteristics (for example, amplitude, frequency, and/or phase) that are within the expected ranges for the connected loads.

If all N inverters 240 are in normal operation (920), the process 900 returns to (910) to continue monitoring the N inverters 240, or the process 900 may end until another troubleshoot command is received. If one or more of the N inverters 240 are not in normal operation (920), the control system 250 attempts to identify the failed or faulted inverter or inverters (930). An inverter has a fault condition due to, for example, overheating, over current, over voltage, and/or component failures. The faulted or failed inverter or inverters may be identified by analyzing the drive signals 204_1 to 204_N and/or determining whether a drive signal is produced by a particular one of the N inverters 240.

If the control system 250 identifies one or more failed inverters, the identified failed inverter or inverters are processed (940). The failed inverter processing includes completing the disconnection process, repairing or replacing the failed inverter or inverters offline, and re-connecting the failed inverter. To disconnect or shut down the identified failed inverter or inverters, the process 800 (FIG. 8) is initiated. For example, if the inverter 240_1 is the identified failed inverter, the inverter 240_1 is disabled (910), the switching apparatus 343_1 is opened (915), and the switching apparatus 343_1 is assessed for a fault if needed (930)-(935). The inverter 240_1 is considered off after the process 800 is performed. The failed inverter 240_1 is repaired or replaced while off line. The failed inverter 240_1 is then reconnected using the process 700 (FIG. 7). The inverter or inverters that are operating normally (that is, the inverters not identified as failed) continue to operate while the processing (940) occurs.

The failed inverter or inverters are assessed to determine if they are operational (960). Continuing the example in which the identified failed inverter is the inverter 240_1, the control system 250 may receive and analyze information about the drive signal 204_1 to determine whether the inverter 240_1 is operational.

Returning to (930), if the failed inverter or inverters are not identified, the control system 250 tests each of the N inverters one-by-one to find the failed inverters. The inverters not under test remain connected to the common DC bus 310 and thus remain operational (unless in a fault condition). One possibly failed inverter is identified (970). For example, the inverter 240_2 may be identified as possibly failed or a candidate for failure or fault. The identified possibly failed inverter (240_2 in this example) is processed (940). The processing (940) is discussed above. After completing the processing (940), the possibly failed inverter (240_2 in this example) is assessed to determine its operational status (980). If the possibly failed inverter (240_2 in this example) is operational, the process 700 ends (985). If the possibly failed inverter is not operational at (980), the process returns to 970 and identifies another one of the N inverters 240 as a possibly failed inverter. The process 900 may continue to perform (970), (940), and (980) until all of the N inverters 240 have been processed, if necessary. After the N inverters 240 are operational, the process 900 ends.

Other implementations are within the scope of the claims.

For example, any pre-charge circuit known in the art that receives an AC electrical input and produces a DC or rectified output may be used as the pre-charge circuit 330 (FIG. 3). In another example, any pre-charge circuit known in the art that receives DC electrical input and produces a DC output may be used as the pre-charge circuit 630 (FIG. 6). Moreover, the switch assemblies 270_1 to 270_N and the switching apparatuses 343_1, 343_2, 343_3, 344_1, 344_2, 344_3 discussed above are examples, and any other switching network that is capable of connecting an inverter to a pre-charge circuit or a common DC bus may be used.

In addition to the respective pre-charge circuit 230, 330, 630, the systems 200, 300, and 600 may include a common pre-charge circuit similar to the common pre-charge circuit 480 shown in FIGS. 4 and 5C-5E. In implementations that include a common pre-charge circuit, at an initial power-on or start-up in which all N inverters are turned on from an off state, the capacitor network of the local DC bus of each of the N inverters is initially pre-charged through the common pre-charge circuit. In these implementations, the pre-charge circuits 230, 330, 630 pre-charge the local DC bus of an individual inverter that is connected to the common DC bus after the other N inverters have already been connected to the common DC bus. Nonetheless, the systems 200, 300, and 600 may be implemented without a common pre-charge circuit and with only the respective pre-charge circuits 230, 330, 630. In these implementations, the pre-charge circuits 230, 330, and 630 are capable of pre-charging the capacitor network associated with all inverters in the system 200, 300, 600 at start up and also are configured to pre-charge the capacitor network on a local DC bus of an additional inverter while some or all of the original inverters remain connected to the common DC bus.

What is claimed is:

1. A system comprising:
a pre-charge circuit configured to produce direct current (DC) electrical power;
a common DC bus;
a plurality of inverters, each inverter comprising: a local DC bus; a capacitor network connected to the local DC bus; and an electrical network connected to the local DC bus, the electrical network configured to generate an alternating current (AC) drive signal; and
a plurality of switching assemblies, each switching assembly being associated with one of the plurality of inverters, and each switching assembly configured to electrically connect the local DC bus and the capacitor network of the associated inverter to one of: (i) the common DC bus and (ii) the pre-charge circuit, wherein the pre-charge circuit is a single pre-charge circuit configured to electrically connect to the local DC bus and capacitor network of any of the plurality of inverters; and the pre-charge circuit is configured to provide the DC electrical power to the capacitor network and the local DC bus of at least one of the plurality of inverters while the local DC bus of at least one other of the plurality of inverters is electrically connected to the common DC bus.

2. The system of claim 1, wherein the pre-charge circuit is electrically connected to an AC electrical power source and further comprises at least one electronic element configured to convert AC electrical power to the DC electrical power.

3. The system of claim 2, wherein the at least one electronic element is a diode.

4. The system of claim 1, further comprising a converter electrically connected to an AC electrical power source and to the common DC bus, and wherein the converter is configured to convert AC electrical power from the AC electrical source to DC electrical power and provides the DC electrical power to the common DC bus.

5. The system of claim 4, wherein the converter is a front-end rectifier and the AC electrical power source comprises a multi-phase high-voltage electrical power distribution network.

6. The system of claim 1, wherein the pre-charge circuit is electrically connected to the common DC bus, and the pre-charge circuit receives DC electrical power from the common DC bus.

7. The system of claim 1, further comprising a control system configured to control the plurality of switching assemblies.

8. The system of claim 1, wherein the pre-charge circuit is an auxiliary pre-charge circuit, and the system further comprises a common pre-charge circuit electrically connected to the common DC bus, and wherein the common pre-charge circuit is configured to provide a DC pre-charge current to all of the capacitor networks while the capacitor networks are electrically connected to the common DC bus.

9. A method comprising:
electrically connecting a first switching assembly associated with a first inverter to a common DC bus and to a pre-charge circuit;
electrically connecting a second switching assembly associated with a second inverter to the common DC bus and to the pre-charge circuit;
electrically connecting a local DC bus of the first inverter to the common DC bus;
operating the second switching assembly associated with the second inverter to electrically connect a local DC bus of the second inverter to the pre-charge circuit while the local DC bus of the first inverter is electrically connected to the common DC bus;
comparing a voltage of a capacitor network electrically connected to the local DC bus of the second inverter to a threshold voltage while the local DC bus of the first inverter is electrically connected to the common DC bus; and
determining whether to disconnect the local DC bus of the second inverter from the pre-charge circuit and whether to connect the local DC bus of the second inverter to the common DC bus based on the comparison.

10. The method of claim 9, wherein determining whether to disconnect the local DC bus of the second inverter from the pre-charge circuit and to connect the local DC bus of the second inverter to the common DC bus based on the comparison comprises disconnecting the second inverter from the pre-charge circuit if a measured voltage of the local DC bus of the second inverter is equal to or greater than the threshold voltage.

11. The method of claim 9, further comprising pre-charging a capacitor network of the first inverter through a common pre-charge circuit electrically connected to the common DC bus prior to operating the second switching assembly.

12. The method of claim 9, further comprising determining whether one or more of the first switching assembly and the second switching assembly is in a fault condition.

13. A system comprising:
a pre-charge circuit configured to produce direct current (DC) electrical power;
a common DC bus; and
a plurality of inverters, each inverter comprising: a local DC bus, a capacitor network electrically connected to the local DC bus, and an electrical network electrically connected to the local DC bus, the electrical network configured to generate an alternating current (AC) drive signal, and wherein the capacitor network of each inverter is configured to be electrically connected to the common DC bus or the pre-charge circuit via a switching network, the pre-charge circuit is single pre-charge circuit configured to be electrically connected to the capacitor network of any of the plurality of inverters, and the pre-charge circuit is configured to provide the DC electrical power to the capacitor network and the local DC bus of at least one of the plurality of inverters while the local DC bus of at least one other of the plurality of inverters is electrically connected to the common DC bus.

14. The system of claim 13, wherein the pre-charge circuit is configured to electrically connect to an AC power source.

15. The system of claim 13, wherein the pre-charge circuit is configured to electrically connect to the common DC bus.

16. The system of claim 13, wherein each switching network comprises a switching assembly, each switching assembly is associated with one of the plurality of inverters, and each switching assembly is configured to control whether the associated inverter is electrically connected to the common DC bus or the pre-charge circuit.

17. The system of claim 13, further comprising a sensor associated with each inverter, the sensor configured to provide an indication of a potential difference between the common DC bus and the local DC bus.

18. The system of claim 17, further comprising a control system configured to analyze the indication.

19. The system of claim 13, further comprising a converter electrically connected to the common DC bus.

20. A system comprising:
a pre-charge circuit configured to produce direct current (DC) electrical power;
a common DC bus;
a plurality of inverters, each inverter comprising: a local DC bus; a capacitor network connected to the local DC bus; and an electrical network connected to the local DC bus, the electrical network configured to generate an alternating current (AC) drive signal; and
a plurality of switching assemblies, each switching assembly being associated with one of the plurality of inverters, and each switching assembly configured to electrically connect the local DC bus and the capacitor network of the associated inverter to one of: (i) the common DC bus and (ii) the pre-charge circuit, wherein the pre-charge circuit is a single pre-charge circuit configured to electrically connect to the local DC bus and capacitor network of any of the plurality of inverters, the pre-charge circuit is an auxiliary pre-charge circuit, and the system further comprises a common pre-charge circuit electrically connected to the common DC bus, and wherein the common pre-charge circuit is configured to provide a DC pre-charge current to all of the capacitor networks while the capacitor networks are electrically connected to the common DC bus.

21. A system comprising:
a pre-charge circuit configured to produce direct current (DC) electrical power;
a common DC bus; and
a plurality of inverters, each inverter comprising: a local DC bus, a capacitor network electrically connected to the local DC bus, and an electrical network electrically connected to the local DC bus, the electrical network configured to generate an alternating current (AC) drive signal, and wherein the capacitor network of each inverter is configured to be electrically connected to the common DC bus or the pre-charge circuit via a switching network, the pre-charge circuit is single pre-charge circuit configured to be electrically connected to the capacitor network of any of the plurality of inverters, the pre-charge circuit is an auxiliary pre-charge circuit, and the system further comprises a common pre-charge circuit electrically connected to the common DC bus, and the common pre-charge circuit is configured to provide a DC pre-charge current to all of the capacitor networks while the capacitor networks are electrically connected to the common DC bus.

* * * * *